United States Patent
Bruce et al.

(10) Patent No.: US 9,875,205 B1
(45) Date of Patent: Jan. 23, 2018

(54) NETWORK OF MEMORY SYSTEMS

(71) Applicant: BiTMICRO Networks, Inc., Fremont, CA (US)

(72) Inventors: Ricardo H. Bruce, Fremont, CA (US); Jarmie De La Cruz Espuerta, Bacolod (PH); Marlon Basa Verdan, Paranaque (PH)

(73) Assignee: BiTMICRO Networks, Inc., Fremont, CA (US)

( * ) Notice: Subject to any disclaimer, the term of this patent is extended or adjusted under 35 U.S.C. 154(b) by 403 days.

(21) Appl. No.: 14/217,161

(22) Filed: Mar. 17, 2014

Related U.S. Application Data

(60) Provisional application No. 61/789,333, filed on Mar. 15, 2013.

(51) Int. Cl.
  G06F 13/42 (2006.01)
  G06F 13/40 (2006.01)
  G06F 13/38 (2006.01)

(52) U.S. Cl.
  CPC ........ G06F 13/4031 (2013.01); G06F 13/385 (2013.01); G06F 13/4027 (2013.01)

(58) Field of Classification Search
  USPC .............. 710/104–110, 306–317, 20–22, 29; 711/147–153
  See application file for complete search history.

(56) References Cited

U.S. PATENT DOCUMENTS

| | | | |
|---|---|---|---|
| 4,402,040 A | 8/1983 | Evett | |
| 4,403,283 A | 9/1983 | Myntti et al. | |
| 4,752,871 A | 6/1988 | Sparks | |
| 4,967,344 A | 10/1990 | Scavezze et al. | |
| 5,111,058 A | 5/1992 | Martin | |
| RE34,100 E | 10/1992 | Hartness | |
| 5,222,046 A | 6/1993 | Kreifels et al. | |
| 5,297,148 A | 3/1994 | Harari et al. | |
| 5,339,404 A | 8/1994 | Vandling, III | |
| 5,341,339 A | 8/1994 | Wells | |
| 5,371,709 A | 12/1994 | Fisher et al. | |
| 5,379,401 A | 1/1995 | Robinson et al. | |
| 5,388,083 A | 2/1995 | Assar et al. | |
| 5,396,468 A | 3/1995 | Harari et al. | |
| 5,406,529 A | 4/1995 | Asano | |

(Continued)

FOREIGN PATENT DOCUMENTS

| | | |
|---|---|---|
| JP | 2005142859 A | 6/2005 |
| JP | 2005-309847 | 11/2005 |

(Continued)

OTHER PUBLICATIONS

USPTO Notice of Allowability & attachment(s) mailed Jan. 7, 2013 for U.S. Appl. No. 12/876,247.

(Continued)

*Primary Examiner* — Raymond Phan

(57) ABSTRACT

A large network of memory system is described comprising a plurality of system controllers and flash memory modules, in accordance with an embodiment of the invention. An apparatus is also described comprising a plurality of flash memory modules interconnected with other flash memory modules and to at least one system controller via a point-to-point communication bus topology, in accordance with another embodiment of the invention.

20 Claims, 8 Drawing Sheets

(56) References Cited

U.S. PATENT DOCUMENTS

| | | |
|---|---|---|
| 5,432,748 A | 7/1995 | Hsu et al. |
| 5,448,577 A | 9/1995 | Wells et al. |
| 5,459,850 A | 10/1995 | Clay et al. |
| 5,479,638 A | 12/1995 | Assar et al. |
| 5,485,595 A | 1/1996 | Assar et al. |
| 5,488,711 A | 1/1996 | Hewitt et al. |
| 5,500,826 A | 3/1996 | Hsu et al. |
| 5,509,134 A | 4/1996 | Fandrich et al. |
| 5,513,138 A | 4/1996 | Manabe et al. |
| 5,524,231 A | 6/1996 | Brown |
| 5,530,828 A | 6/1996 | Kaki et al. |
| 5,535,328 A | 7/1996 | Harari et al. |
| 5,535,356 A | 7/1996 | Kim et al. |
| 5,542,042 A | 7/1996 | Manson |
| 5,542,082 A | 7/1996 | Solhjell |
| 5,548,741 A | 8/1996 | Watanabe |
| 5,559,956 A | 9/1996 | Sukegawa |
| 5,568,423 A | 10/1996 | Jou et al. |
| 5,568,439 A | 10/1996 | Harari |
| 5,572,466 A | 11/1996 | Sukegawa |
| 5,594,883 A | 1/1997 | Pricer |
| 5,602,987 A | 2/1997 | Harari et al. |
| 5,603,001 A | 2/1997 | Sukegawa et al. |
| 5,606,529 A | 2/1997 | Honma et al. |
| 5,606,532 A | 2/1997 | Lambrache et al. |
| 5,619,470 A | 4/1997 | Fukumoto |
| 5,627,783 A | 5/1997 | Miyauchi |
| 5,640,349 A | 6/1997 | Kakinuma et al. |
| 5,644,784 A | 7/1997 | Peek |
| 5,682,509 A | 10/1997 | Kabenjian |
| 5,737,742 A | 4/1998 | Achiwa et al. |
| 5,765,023 A | 6/1998 | Leger et al. |
| 5,787,466 A | 7/1998 | Berliner |
| 5,796,182 A | 8/1998 | Martin |
| 5,799,200 A | 8/1998 | Brant et al. |
| 5,802,554 A | 9/1998 | Caceres et al. |
| 5,818,029 A | 10/1998 | Thomson |
| 5,819,307 A | 10/1998 | Iwamoto et al. |
| 5,822,251 A | 10/1998 | Bruce et al. |
| 5,864,653 A | 1/1999 | Tavallaei et al. |
| 5,870,627 A | 2/1999 | O'Toole et al. |
| 5,875,351 A | 2/1999 | Riley |
| 5,881,264 A | 3/1999 | Kurosawa |
| 5,913,215 A | 6/1999 | Rubinstein et al. |
| 5,918,033 A | 6/1999 | Heeb et al. |
| 5,930,481 A | 7/1999 | Benhase |
| 5,933,849 A | 8/1999 | Srbljic et al. |
| 5,943,421 A | 8/1999 | Grabon |
| 5,956,743 A | 9/1999 | Bruce et al. |
| 5,987,621 A | 11/1999 | Duso |
| 6,000,006 A | 12/1999 | Bruce et al. |
| 6,014,709 A | 1/2000 | Gulick et al. |
| 6,076,137 A | 6/2000 | Asnaashari |
| 6,098,119 A | 8/2000 | Surugucchi et al. |
| 6,128,303 A | 10/2000 | Bergantino |
| 6,138,200 A | 10/2000 | Ogilvie |
| 6,138,247 A | 10/2000 | McKay et al. |
| 6,151,641 A | 11/2000 | Herbert |
| 6,215,875 B1 | 4/2001 | Nohda |
| 6,230,269 B1 | 5/2001 | Spies et al. |
| 6,298,071 B1 | 10/2001 | Taylor et al. |
| 6,341,342 B1 | 1/2002 | Thompson et al. |
| 6,363,441 B1 | 3/2002 | Beniz et al. |
| 6,363,444 B1 | 3/2002 | Platko et al. |
| 6,397,267 B1 | 5/2002 | Chong, Jr. |
| 6,404,772 B1 | 6/2002 | Beach et al. |
| 6,452,602 B1 | 9/2002 | Morein |
| 6,496,939 B2 | 12/2002 | Portman et al. |
| 6,526,506 B1 | 2/2003 | Lewis |
| 6,529,416 B2 | 3/2003 | Bruce et al. |
| 6,557,095 B1 | 4/2003 | Henstrom |
| 6,574,142 B2 | 6/2003 | Gelke |
| 6,601,126 B1 * | 7/2003 | Zaidi ............ G06F 15/7832 710/100 |
| 6,678,754 B1 | 1/2004 | Soulier |
| 6,728,840 B1 | 4/2004 | Shatil |
| 6,744,635 B2 | 6/2004 | Portman et al. |
| 6,757,845 B2 | 6/2004 | Bruce |
| 6,785,746 B1 | 8/2004 | Mahmoud et al. |
| 6,857,076 B1 | 2/2005 | Klein |
| 6,901,499 B2 | 5/2005 | Aasheim et al. |
| 6,922,391 B1 | 7/2005 | King et al. |
| 6,961,805 B2 | 11/2005 | Lakhani et al. |
| 6,970,446 B2 | 11/2005 | Krischer et al. |
| 6,970,890 B1 | 11/2005 | Bruce et al. |
| 6,973,546 B2 | 12/2005 | Johnson |
| 6,980,795 B1 | 12/2005 | Hermann et al. |
| 7,103,684 B2 | 9/2006 | Chen et al. |
| 7,174,438 B2 | 2/2007 | Homma et al. |
| 7,194,766 B2 | 3/2007 | Noehring et al. |
| 7,263,006 B2 | 8/2007 | Aritome |
| 7,283,629 B2 | 10/2007 | Kaler et al. |
| 7,305,548 B2 | 12/2007 | Pierce et al. |
| 7,330,954 B2 | 2/2008 | Nangle |
| 7,372,962 B2 | 5/2008 | Fujimoto et al. |
| 7,386,662 B1 | 6/2008 | Kekre et al. |
| 7,412,631 B2 | 8/2008 | Uddenberg et al. |
| 7,415,549 B2 | 8/2008 | Vemula et al. |
| 7,424,553 B1 | 9/2008 | Borrelli et al. |
| 7,430,650 B1 | 9/2008 | Ross |
| 7,474,926 B1 | 1/2009 | Carr et al. |
| 7,478,186 B1 | 1/2009 | Onufryk et al. |
| 7,490,177 B2 | 2/2009 | Kao |
| 7,496,699 B2 | 2/2009 | Pope et al. |
| 7,500,063 B2 | 3/2009 | Zohar et al. |
| 7,506,098 B2 | 3/2009 | Arcedera et al. |
| 7,613,876 B2 | 11/2009 | Bruce et al. |
| 7,620,748 B1 | 11/2009 | Bruce et al. |
| 7,620,749 B2 | 11/2009 | Biran et al. |
| 7,624,239 B2 | 11/2009 | Bennett et al. |
| 7,636,801 B1 | 12/2009 | Kekre et al. |
| 7,660,941 B2 | 2/2010 | Lee et al. |
| 7,668,925 B1 | 2/2010 | Liao et al. |
| 7,676,640 B2 | 3/2010 | Chow |
| 7,681,188 B1 | 3/2010 | Tirumalai et al. |
| 7,716,389 B1 | 5/2010 | Bruce et al. |
| 7,719,287 B2 | 5/2010 | Marks et al. |
| 7,729,370 B1 | 6/2010 | Orcine et al. |
| 7,743,202 B2 | 6/2010 | Tsai et al. |
| 7,765,359 B2 | 7/2010 | Kang et al. |
| 7,877,639 B2 | 1/2011 | Hoang |
| 7,913,073 B2 | 3/2011 | Choi |
| 7,921,237 B1 | 4/2011 | Holland et al. |
| 7,934,052 B2 | 4/2011 | Prins et al. |
| 7,958,295 B1 | 6/2011 | Liao et al. |
| 7,979,614 B1 * | 7/2011 | Yang .................. G06F 3/0604 710/29 |
| 7,996,581 B2 | 8/2011 | Bond et al. |
| 8,010,740 B2 | 8/2011 | Arcedera et al. |
| 8,032,700 B2 | 10/2011 | Bruce et al. |
| 8,156,279 B2 | 4/2012 | Tanaka et al. |
| 8,156,320 B2 | 4/2012 | Borras |
| 8,161,223 B2 | 4/2012 | Chamseddine et al. |
| 8,165,301 B1 | 4/2012 | Bruce et al. |
| 8,200,879 B1 | 6/2012 | Falik et al. |
| 8,219,719 B1 | 7/2012 | Parry et al. |
| 8,225,022 B2 * | 7/2012 | Caulkins ............ G06F 13/385 710/301 |
| 8,341,300 B1 | 12/2012 | Karamcheti |
| 8,341,311 B1 | 12/2012 | Szewerenko et al. |
| 8,375,257 B2 | 2/2013 | Hong et al. |
| 8,447,908 B2 | 5/2013 | Bruce et al. |
| 8,489,914 B2 | 7/2013 | Cagno |
| 8,510,631 B2 | 8/2013 | Wu et al. |
| 8,560,804 B2 | 10/2013 | Bruce et al. |
| 8,583,868 B2 | 11/2013 | Belluomini et al. |
| 8,677,042 B2 | 3/2014 | Gupta et al. |
| 8,707,134 B2 | 4/2014 | Takahashi et al. |
| 8,713,417 B2 | 4/2014 | Jo |
| 8,762,609 B1 | 6/2014 | Lam et al. |
| 8,788,725 B2 | 7/2014 | Bruce et al. |
| 8,832,371 B2 | 9/2014 | Uehara et al. |
| 8,856,392 B2 | 10/2014 | Myrah et al. |
| 8,959,307 B1 | 2/2015 | Bruce et al. |

(56) References Cited

U.S. PATENT DOCUMENTS

| | | |
|---|---|---|
| 9,043,669 B1 | 5/2015 | Bruce et al. |
| 9,099,187 B2 | 8/2015 | Bruce et al. |
| 9,135,190 B1 | 9/2015 | Bruce et al. |
| 9,147,500 B2 | 9/2015 | Kim et al. |
| 9,158,661 B2 | 10/2015 | Blaine et al. |
| 9,201,790 B2 | 12/2015 | Keeler |
| 9,400,617 B2 | 7/2016 | Ponce et al. |
| 2001/0010066 A1 | 7/2001 | Chin et al. |
| 2002/0011607 A1 | 1/2002 | Gelke et al. |
| 2002/0013880 A1 | 1/2002 | Gappisch et al. |
| 2002/0044486 A1 | 4/2002 | Chan et al. |
| 2002/0073324 A1 | 6/2002 | Hsu et al. |
| 2002/0083262 A1 | 6/2002 | Fukuzumi |
| 2002/0083264 A1 | 6/2002 | Coulson |
| 2002/0141244 A1 | 10/2002 | Bruce et al. |
| 2003/0023817 A1 | 1/2003 | Rowlands et al. |
| 2003/0065836 A1 | 4/2003 | Pecone |
| 2003/0097248 A1 | 5/2003 | Terashima et al. |
| 2003/0120864 A1 | 6/2003 | Lee et al. |
| 2003/0126451 A1 | 7/2003 | Gorobets |
| 2003/0131201 A1 | 7/2003 | Khare et al. |
| 2003/0161355 A1 | 8/2003 | Falcomato et al. |
| 2003/0163624 A1 | 8/2003 | Matsui et al. |
| 2003/0163647 A1 | 8/2003 | Cameron et al. |
| 2003/0163649 A1 | 8/2003 | Kapur et al. |
| 2003/0182576 A1 | 9/2003 | Morlang et al. |
| 2003/0188100 A1 | 10/2003 | Solomon et al. |
| 2003/0204675 A1 | 10/2003 | Dover et al. |
| 2003/0217202 A1* | 11/2003 | Zilberman ............... G06F 13/28 710/22 |
| 2003/0223585 A1 | 12/2003 | Tardo et al. |
| 2004/0073721 A1 | 4/2004 | Goff et al. |
| 2004/0078632 A1 | 4/2004 | Infante et al. |
| 2004/0128553 A1 | 7/2004 | Buer et al. |
| 2004/0215868 A1 | 10/2004 | Solomon et al. |
| 2005/0050245 A1 | 3/2005 | Miller et al. |
| 2005/0055481 A1 | 3/2005 | Chou et al. |
| 2005/0078016 A1 | 4/2005 | Neff |
| 2005/0097368 A1 | 5/2005 | Peinado et al. |
| 2005/0120146 A1 | 6/2005 | Chen et al. |
| 2005/0210149 A1 | 9/2005 | Kimball |
| 2005/0210159 A1 | 9/2005 | Voorhees et al. |
| 2005/0226407 A1 | 10/2005 | Kasuya et al. |
| 2005/0240707 A1 | 10/2005 | Hayashi et al. |
| 2005/0243610 A1 | 11/2005 | Guha et al. |
| 2005/0289361 A1 | 12/2005 | Sutardja |
| 2006/0004957 A1 | 1/2006 | Hand et al. |
| 2006/0026329 A1 | 2/2006 | Yu |
| 2006/0031450 A1 | 2/2006 | Unrau et al. |
| 2006/0039406 A1 | 2/2006 | Day et al. |
| 2006/0064520 A1 | 3/2006 | Anand et al. |
| 2006/0095709 A1 | 5/2006 | Achiwa |
| 2006/0112251 A1 | 5/2006 | Karr et al. |
| 2006/0129876 A1 | 6/2006 | Uemura |
| 2006/0173970 A1 | 8/2006 | Pope et al. |
| 2006/0184723 A1 | 8/2006 | Sinclair et al. |
| 2007/0019573 A1 | 1/2007 | Nishimura |
| 2007/0028040 A1 | 2/2007 | Sinclair |
| 2007/0058478 A1 | 3/2007 | Murayama |
| 2007/0073922 A1 | 3/2007 | Go et al. |
| 2007/0079017 A1 | 4/2007 | Brink et al. |
| 2007/0083680 A1 | 4/2007 | King et al. |
| 2007/0088864 A1 | 4/2007 | Foster |
| 2007/0093124 A1 | 4/2007 | Varney et al. |
| 2007/0094450 A1 | 4/2007 | VanderWiel |
| 2007/0096785 A1 | 5/2007 | Maeda |
| 2007/0121499 A1 | 5/2007 | Pal et al. |
| 2007/0130439 A1 | 6/2007 | Andersson et al. |
| 2007/0159885 A1 | 7/2007 | Gorobets |
| 2007/0168754 A1 | 7/2007 | Zohar et al. |
| 2007/0174493 A1 | 7/2007 | Irish et al. |
| 2007/0174506 A1 | 7/2007 | Tsuruta |
| 2007/0195957 A1 | 8/2007 | Arulambalam et al. |
| 2007/0288686 A1 | 12/2007 | Arcedera et al. |
| 2007/0288692 A1 | 12/2007 | Bruce et al. |
| 2007/0294572 A1 | 12/2007 | Kalwitz et al. |
| 2008/0052456 A1 | 2/2008 | Ash et al. |
| 2008/0052585 A1 | 2/2008 | LaBerge et al. |
| 2008/0072031 A1 | 3/2008 | Choi |
| 2008/0104264 A1 | 5/2008 | Duerk et al. |
| 2008/0147963 A1 | 6/2008 | Tsai et al. |
| 2008/0189466 A1 | 8/2008 | Hemmi |
| 2008/0195800 A1 | 8/2008 | Lee et al. |
| 2008/0218230 A1 | 9/2008 | Shim |
| 2008/0228959 A1 | 9/2008 | Wang |
| 2008/0276037 A1* | 11/2008 | Chang ................... G06F 3/0613 711/103 |
| 2009/0028229 A1 | 1/2009 | Cagno et al. |
| 2009/0037565 A1 | 2/2009 | Andresen et al. |
| 2009/0055573 A1 | 2/2009 | Ito |
| 2009/0077306 A1 | 3/2009 | Arcedera et al. |
| 2009/0083022 A1 | 3/2009 | Bin Mohd Nordin et al. |
| 2009/0094411 A1 | 4/2009 | Que |
| 2009/0132620 A1 | 5/2009 | Arakawa |
| 2009/0132752 A1 | 5/2009 | Poo et al. |
| 2009/0150643 A1 | 6/2009 | Jones et al. |
| 2009/0158085 A1 | 6/2009 | Kern et al. |
| 2009/0172250 A1 | 7/2009 | Allen et al. |
| 2009/0172261 A1 | 7/2009 | Prins et al. |
| 2009/0172466 A1 | 7/2009 | Royer et al. |
| 2009/0240873 A1* | 9/2009 | Yu ........................ G06F 3/0608 711/103 |
| 2010/0058045 A1 | 3/2010 | Borras et al. |
| 2010/0095053 A1 | 4/2010 | Bruce et al. |
| 2010/0125695 A1 | 5/2010 | Wu et al. |
| 2010/0250806 A1 | 9/2010 | Devilla et al. |
| 2010/0268904 A1 | 10/2010 | Sheffield et al. |
| 2010/0299538 A1 | 11/2010 | Miller |
| 2010/0318706 A1 | 12/2010 | Kobayashi |
| 2011/0022778 A1 | 1/2011 | Schibilla et al. |
| 2011/0022783 A1* | 1/2011 | Moshayedi ............ G06F 13/385 711/103 |
| 2011/0022801 A1 | 1/2011 | Flynn |
| 2011/0087833 A1 | 4/2011 | Jones |
| 2011/0093648 A1 | 4/2011 | Belluomini et al. |
| 2011/0113186 A1 | 5/2011 | Bruce et al. |
| 2011/0133826 A1 | 6/2011 | Jones et al. |
| 2011/0145479 A1 | 6/2011 | Talagala et al. |
| 2011/0161568 A1 | 6/2011 | Bruce et al. |
| 2011/0167204 A1 | 7/2011 | Estakhri et al. |
| 2011/0173383 A1 | 7/2011 | Gorobets |
| 2011/0197011 A1 | 8/2011 | Suzuki et al. |
| 2011/0202709 A1 | 8/2011 | Rychlik |
| 2011/0208901 A1 | 8/2011 | Kim et al. |
| 2011/0208914 A1 | 8/2011 | Winokur et al. |
| 2011/0219150 A1 | 9/2011 | Piccirillo et al. |
| 2011/0258405 A1 | 10/2011 | Asaki et al. |
| 2011/0264884 A1 | 10/2011 | Kim |
| 2011/0264949 A1 | 10/2011 | Ikeuchi et al. |
| 2011/0270979 A1 | 11/2011 | Schlansker et al. |
| 2012/0005405 A1 | 1/2012 | Wu et al. |
| 2012/0005410 A1 | 1/2012 | Ikeuchi |
| 2012/0017037 A1 | 1/2012 | Riddle et al. |
| 2012/0079352 A1* | 3/2012 | Frost ..................... G06F 11/1008 714/767 |
| 2012/0102263 A1 | 4/2012 | Aswadhati |
| 2012/0102268 A1 | 4/2012 | Smith et al. |
| 2012/0137050 A1 | 5/2012 | Wang et al. |
| 2012/0161568 A1* | 6/2012 | Umemoto ............... H02K 55/04 310/198 |
| 2012/0173795 A1 | 7/2012 | Schuette et al. |
| 2012/0215973 A1 | 8/2012 | Cagno et al. |
| 2012/0249302 A1 | 10/2012 | Szu |
| 2012/0260102 A1 | 10/2012 | Zaks et al. |
| 2012/0271967 A1 | 10/2012 | Hirschman |
| 2012/0303924 A1 | 11/2012 | Ross |
| 2012/0311197 A1 | 12/2012 | Larson et al. |
| 2012/0324277 A1* | 12/2012 | Weston-Lewis ..... G06F 11/1068 714/6.11 |
| 2013/0010058 A1 | 1/2013 | Pomeroy |
| 2013/0019053 A1* | 1/2013 | Somanache ......... G06F 13/1684 711/103 |
| 2013/0073821 A1 | 3/2013 | Flynn et al. |
| 2013/0094312 A1 | 4/2013 | Jan et al. |

(56) References Cited

U.S. PATENT DOCUMENTS

| | | |
|---|---|---|
| 2013/0099838 A1 | 4/2013 | Kim et al. |
| 2013/0111135 A1 | 5/2013 | Bell, Jr. et al. |
| 2013/0206837 A1 | 8/2013 | Szu |
| 2013/0208546 A1 | 8/2013 | Kim et al. |
| 2013/0212337 A1 | 8/2013 | Maruyama |
| 2013/0212349 A1 | 8/2013 | Maruyama |
| 2013/0212425 A1 | 8/2013 | Blaine et al. |
| 2013/0246694 A1 | 9/2013 | Bruce et al. |
| 2013/0254435 A1 | 9/2013 | Shapiro et al. |
| 2013/0262750 A1 | 10/2013 | Yamasaki et al. |
| 2013/0282933 A1 | 10/2013 | Jokinen et al. |
| 2013/0304775 A1 | 11/2013 | Davis et al. |
| 2013/0339578 A1 | 12/2013 | Ohya et al. |
| 2013/0339582 A1 | 12/2013 | Olbrich et al. |
| 2013/0346672 A1 | 12/2013 | Sengupta et al. |
| 2014/0068177 A1 | 3/2014 | Raghavan |
| 2014/0095803 A1 | 4/2014 | Kim et al. |
| 2014/0104949 A1 | 4/2014 | Bruce et al. |
| 2014/0108869 A1 | 4/2014 | Brewerton et al. |
| 2014/0189203 A1 | 7/2014 | Suzuki et al. |
| 2014/0258788 A1 | 9/2014 | Maruyama |
| 2014/0285211 A1 | 9/2014 | Raffinan |
| 2014/0331034 A1 | 11/2014 | Ponce et al. |
| 2015/0006766 A1 | 1/2015 | Ponce et al. |
| 2015/0012690 A1 | 1/2015 | Bruce et al. |
| 2015/0032937 A1 | 1/2015 | Salessi |
| 2015/0032938 A1 | 1/2015 | Salessi |
| 2015/0067243 A1 | 3/2015 | Salessi et al. |
| 2015/0149697 A1 | 5/2015 | Salessi et al. |
| 2015/0149706 A1 | 5/2015 | Salessi et al. |
| 2015/0153962 A1 | 6/2015 | Salessi et al. |
| 2015/0169021 A1 | 6/2015 | Salessi et al. |
| 2015/0261456 A1 | 9/2015 | Alcantara et al. |
| 2015/0261475 A1 | 9/2015 | Alcantara et al. |
| 2015/0261797 A1 | 9/2015 | Alcantara et al. |
| 2015/0370670 A1 | 12/2015 | Lu |
| 2015/0371684 A1 | 12/2015 | Mataya |
| 2015/0378932 A1 | 12/2015 | Souri et al. |
| 2016/0026402 A1 | 1/2016 | Alcantara et al. |
| 2016/0027521 A1 | 1/2016 | Lu |
| 2016/0041596 A1 | 2/2016 | Alcantara et al. |

FOREIGN PATENT DOCUMENTS

| | | |
|---|---|---|
| TW | 489308 | 6/2002 |
| TW | 200428219 A | 12/2004 |
| TW | 436689 | 12/2005 |
| TW | I420316 | 12/2013 |
| WO | WO 94/06210 | 3/1994 |
| WO | WO 98/38568 | 9/1998 |

OTHER PUBLICATIONS

Office Action mailed Sep. 14, 2012 for U.S. Appl. No. 12/876,247.
Office Action mailed Feb. 1, 2012 for U.S. Appl. No. 12/876,247.
Notice of Allowance/Allowability mailed Mar. 31, 2015 for U.S. Appl. No. 13/475,878.
Office Action mailed May 22, 2015 for U.S. Appl. No. 13/253,912.
Notice of Allowance/Allowability for U.S. Appl. No. 13/890,229 mailed on Feb. 20, 2014.
Office Action for U.S. Appl. No. 13/890,229 mailed on Oct. 8, 2013.
Office Action for U.S. Appl. No. 12/876,113 mailed on Dec. 5, 2014.
Notice of Allowance/Allowabilty for U.S. Appl. No. 12/876,113 mailed on Jun. 22, 2015.
Office Action for U.S. Appl. No. 14/217,249 mailed on Apr. 2, 2015.
Office Action for U.S. Appl. No. 14/217,467 mailed on Apr. 27, 2015.
Office Action for U.S. Appl. No. 14/616,700 mailed on Apr. 30, 2015.
Office Action for U.S. Appl. No. 14/217,436 mailed on Sep. 11, 2015.
Office Action for U.S. Appl. No. 13/253,912 mailed on Jul. 16, 2014.
Office Action for U.S. Appl. No. 13/475,878 mailed on Jun. 23, 2014.
Office Action for U.S. Appl. No. 12/876,113 mailed on Jul. 11, 2014.
Office Action for U.S. Appl. No. 12/876,113 mailed on Oct. 16, 2014.
Notice of Allowance for U.S. Appl. No. 12/270,626 mailed Oct. 3, 2014.
Office Action for U.S. Appl. No. 12/270,626 mailed on May 23, 2014.
Office Action for U.S. Appl. No. 12/270,626 mailed on Apr. 4, 2011.
Office Action for U.S. Appl. No. 12/270,626 mailed on Dec. 18, 2013.
Office Action for U.S. Appl. No. 12/270,626 mailed on Mar. 15, 2013.
Office Action for U.S. Appl. No. 12/270,626 mailed on Aug. 23, 2012.
Office Action mailed oct. 8, 2015 for U.S. Appl. No. 14/217,291.
Final Office Action mailed Nov. 19, 2015 for U.S. Appl. No. 14/217,249.
Final Office Action mailed Nov. 18, 2015 for U.S. Appl. No. 14/217,467.
Office Action mailed Nov. 25, 2015 for U.S. Appl. No. 14/217,041.
Office Action mailed Sep. 11, 2015 for U.S. Appl. No. 14/217,436.
Office Action mailed Sep. 24, 2015 for U.S. Appl. No. 14/217,334.
Office Action dated Sep. 18, 2015 for Taiwanese Patent Application No. 102144165.
Office Action mailed Sep. 29, 2015 for U.S. Appl. No. 14/217,316.
Office Action mailed Sep. 28, 2015 for U.S. Appl. No. 14/689,045.
Office Action mailed Dec. 15, 2015 for U.S. Appl. No. 13/253,912.
Office Action mailed Dec. 17, 2015 for U.S. Appl. No. 14/214,216.
Office Action mailed Dec. 17, 2015 for U.S. Appl. No. 14/215,414.
Office Action mailed Dec. 17, 2015 for U.S. Appl. No. 14/803,107.
Office Action mailed Jan. 15, 2016 for U.S. Appl. No. 14/866,946.
Office Action mailed Jan. 11, 2016 for U.S. Appl. No. 14/217,399.
Office Action mailed Jan. 15, 2016 for U.S. Appl. No. 14/216,937.
Notice of Allowance and Examiner-Initiated Interview Summary, mailed Jan. 29, 2016 for U.S. Appl. No. 14/297,628.
National Science Fountation,Award Abstract #1548968, SBIR Phase I: SSD In-Situ Processing, http://www.nsf.gov/awardsearch/showAward?AWD_ID=1548968 printed on Feb. 13, 2016.
Design-Reuse, NxGn Data Emerges from Stealth Mode to provide a paradigm shift in enterprise storage solution. http://www.design-reuse.com/news/35111/nxgn-data-intelligent-solutions.html, printed on Feb. 13, 2016.
Office Action mailed Oct. 5, 2015 for Taiwanese Application No. 103105076.
Office Action mailed Nov. 19, 2015 for U.S. Appl. No. 14/217,249.
Office Action mailed Nov. 18, 2015 for U.S. Appl. No. 14/217,467.
Office Action mailed Dec. 4, 2015 for U.S. Appl. No. 14/616,700.
Office Action mailed Jun. 4, 2015 for U.S. Appl. No. 14/215,414.
Office Action for U.S. Appl. No. 14/217,365 dated Feb. 18, 2016.
Office Action for U.S. Appl. No. 14/217,365 dated Mar. 2, 2016.
Office Action for U.S. Appl. No. 14/690,305 dated Feb. 25, 2016.
Office Action for U.S. Appl. No. 14/217,436 dated Feb. 25, 2016.
Office Action for U.S. Appl. No. 14/217,316 dated Feb. 26, 2016.
Office Action for U.S. Appl. No. 14/215,414 dated Mar. 1, 2016.
Office Action for U.S. Appl. No. 14/616,700 dated Mar. 8, 2016.
Notice of allowance/allowability for U.S. Appl. No. 13/253,912 dated Mar. 21, 2016.
Office Action for U.S. Appl. No. 13/475,878, mailed on Jun. 23, 2014.
Office Action for U.S. Appl. No. 12/270,626 mailed on Feb. 3, 2012.
Notice of Allowance/Allowability for U.S. Appl. No. 12/270,626 mailed on Oct. 3, 2014.
Advisory Action for U.S. Appl. No. 12/876,113 mailed on Oct. 16, 2014.
Office Action for U.S. Appl. No. 14/297,628 mailed on Jul. 17, 2015.
Office Action for U.S. Appl. No. 13/475,878 mailed on Dec. 4, 2014.
Office Action mailed Dec. 5, 2014 for U.S. Appl. No. 14/038,684.
Notice of allowance/allowability for U.S. Appl. No. 14/803,107 dated Mar. 28, 2016.

(56) References Cited

OTHER PUBLICATIONS

Office Action for U.S. Appl. No. 14/217,334 dated Apr. 4, 2016.
Office Action for U.S. Appl. No. 14/217,249 dated Apr. 21, 2016.
Notice of allowance/allowability for U.S. Appl. No. 14/217,467 dated Apr. 20, 2016.
Notice of allowance/allowability for U.S. Appl. No. 14/217,041 dated Apr. 11, 2016.
Office Action for U.S. Appl. No. 12/876,113 mailed on Mar. 13, 2014.
Advisory Action for U.S. Appl. No. 12/876,113 mailed on Sep. 6, 2013.
Office Action for U.S. Appl. No. 12/876,113 mailed on May 14, 2013.
Office Action for U.S. Appl. No. 12/876,113 mailed on Dec. 21, 2012.
Security Comes to SNMP: The New SNMPv3 Proposed Internet Standard, The Internet Protocol Journal, vol. 1, No. 3, Dec. 1998.
Notice of Allowability for U.S. Appl. No. 12/882,059 mailed on May 30, 2013.
Notice of Allowability for U.S. Appl. No. 12/882,059 mailed on Feb. 14, 2013.
Office Action for U.S. Appl. No. 12/882,059 mailed on May 11, 2012.
Notice of Allowability for U.S. Appl. No. 14/038,684 mailed on Aug. 1, 2014.
Office Action for U.S. Appl. No. 14/038,684 mailed on Mar. 17, 2014.
Office Action for U.S. Appl. No. 14/217,096 dated Jul. 12, 2016.
Notice of Allowance for U.S. Appl. No. 14/217,399 dated Jul. 20, 2016 (Mailed in this current application).
Office Action for U.S. Appl. No. 14/866,946 dated Jul. 29, 2016.
Notice of Allowance for U.S. Appl. No. 14/217,334 dated Jul. 29, 2016.
Office Action for U.S. Appl. No. 14/690,243 dated Aug. 11, 2016.
Office Action for U.S. Appl. No. 14/690,370 dated Aug. 12, 2016.
Working Draft American National Standard Project T10/1601-D Information Technology Serial Attached SCSI—1.1 (SAS-1.1), Mar. 13, 2004 Revision 4.
Office Action for U.S. Appl. No. 14/217,316 dated Aug. 25, 2016.
Office Action for U.S. App. No. 14/690,305 dated Aug. 26, 2016.
Advisory Action for U.S. Appl. No. 14/217,291 dated Sep. 9, 2016.
Advisory Action for U.S. Appl. No. 14/689,045 dated Sep. 16, 2016.
Notice of Allowance for U.S. Appl. No. 14/182,303 dated Sep. 12, 2016.
Advisory Action for U.S. Appl. No. 14/690,114 dated Sep. 12, 2016.
Notice of Allowance for U.S. Appl. No. 14/215,414 dated Sep. 23, 2016.
Advisory Action for U.S. Appl. No. 14/866,946 dated Oct. 13, 2016.
Office Action for U.S. Appl. No. 14/687,700 dated Sep. 26, 2016.
Office Action for U.S. Appl. No. 15/170,768 dated Oct. 6, 2016.
Notice of allowance/allowability for U.S. Appl. No. 14/217, 365 dated Oct. 18, 2016.
Notice of allowance/allowability for U.S. Appl. No. 14/214,216 dated Apr. 27, 2016.
Notice of allowance/allowability for U.S. Appl. No. 14/217,436 dated May 6, 2016.
Advisory Action for U.S. Appl. No. 14/217,334 dated Jun. 13, 2016.
Office Action for U.S. Appl. No. 14/217,291 dated Jun. 15, 2016.
Office Action for U.S. Appl. No. 14/215,414 dated May 20, 2016.
Office Action for U.S. Appl. No. 14/616,700 dated May 20, 2016.
Office Action for U.S. Appl. No. 14/689,019 dated May 20, 2016.
Advisory Action for U.S. Appl. No. 14/217,316 dated May 19, 2016.
Advisory Action for U.S. Appl. No. 14/690,305 dated Nov. 25, 2016.
Office Action for U.S. Appl. No. 14/216,937 dated Aug. 15, 2016.
Notice of Allowance for U.S. Appl. No. 14/217,096 dated Dec. 5, 2016.
Notice of Allowance for U.S. Appl. No. 14/217,161 dated Dec. 30, 2016.
Office Action for U.S. Appl. No. 14/866,946 dated Jan. 5, 2017.
Office Action for U.S. Appl. No. 14/688,209 dated Jan. 11, 2017.
Amazon Route 53 Developer Guide API Version Apr. 1, 2013, copyright 2017 by Amazon Web Services.
Host Bus Adapters (HBAs): What you need to know about networking workhorse by Alan Earls, Feb. 2003.
Office Action for U.S. Appl. No. 14/690,243 dated Jan. 13, 2017.
Office Action for U.S. Appl. No. 14/232,801 dated Jan. 19, 2017.
Office Action for U.S. Appl. No. 14/616,700 dated Oct. 20, 2016.
Office Action for U.S. Appl. No. 14/855,245 dated Oct. 26, 2016.
Office Action for U.S. Appl. No. 14/217,249 dated Oct. 28, 2016.
Office Action for U.S. Appl. No. 14/217,399 dated Nov. 1, 2016.
Office Action for U.S. Appl. No. 14/217,291 dated Nov. 3, 2016.
Office Action for U.S. Appl. No. 14/217,947 dated Nov. 4, 2016.
Office Action for U.S. Appl. No. 14/216,627 dated Nov. 7, 2016.
Office Action for U.S. Appl. No. 14/689,019 dated Nov. 18, 2016.
Office Action for U.S. Appl. No. 14/684,399 dated Nov. 21, 2016.
Notice of Allowance for U.S. Appl. No. 14/689,045 dated Nov. 21, 2016.
Notice of Allowance for U.S. Appl. No. 14/217,334 dated Nov. 23, 2016.
Notice of Allowance for U.S. Appl. No. 14/215,414 dated Jan. 20, 2017.
Advisory Action for U.S. Appl. No. 14/217,249 dated Jan. 26, 2017.
Notice of Allowance for U.S. Appl. No. 14/687,700 dated Jan. 27, 2016.
Office Action for U.S. Appl. No. 14/690,339 dated Feb. 3, 2017.
Office Action for U.S. Appl. No. 14/616,700 dated Feb. 9, 2017.
Notice of Allowance for U.S. Appl. No. 14/217,365 dated Feb. 10, 2017.
Office Action for U.S. Appl. No. 14/690,305 dated Feb. 10, 2017.
Office Action for U.S. Appl. No. 14/690,349 dated Feb. 8, 2017.
Advisory Action for U.S. Appl. No. 14/689,019 dated Feb. 17, 2017.

* cited by examiner

NETWORK OF MEMORY SYSTEMS

CROSS-REFERENCE(S) TO RELATED APPLICATIONS

This application claims the benefit of and priority to U.S. Provisional Application 61/789,333, filed 15 Mar. 2013. This U.S. Provisional Application 61/789,333 is hereby fully incorporated herein by reference.

FIELD

Embodiments of the invention relate generally to a large network of memory systems comprising a plurality of system controllers and flash memory modules.

DESCRIPTION OF RELATED ART

Increasingly, memory chips are at the front-end of microelectronics and product functionality. Flash memory in particular satisfies the embedded needs for low power consumption, high shock, vibration and temperature tolerance, and fast access to random data. It is intuitive that flash, because it is solid state and has no moving parts, is inherently more rugged than a rotating hard disk drive.

Large capacity flash memory devices were initially used as external storage media for portable personal computers in industrial applications. Then in order to meet the needs of high-end storage market, the memory capacity of flash memory has also increased to keep pace with the rapid penetration and expansion of the internet and the intranets.

At present, to keep pace with the enhanced capabilities of the Central Processing Units (CPUs), larger and larger memory capacities are required on those servers, workstations, and/or other computing devices that carry out vast numbers of function. Chip sets are now capable of supporting larger memory units. Most of the companies used stacking technology to introduce large memory units of flash memory devices. These flash devices are mounted on a single board, and are space-saving and support multiple bit organization.

With all these features, new approaches to dense and high speed interconnects of flash memory modules are needed. In most multi-chip applications, data distribution from and to the memory chips that may reside on a module or on an adjacent memory board can become one of the major bottlenecks in high-performance system implementation.

Redundancy is implemented in the field of storage devices to increase the reliability of the multi-chip memory systems in which two or more controllers are provided in the system controller to serve as redundant components when failure occurs. The interconnection between the multiple chip controller and the flash memory modules containing an array of flash devices is arranged such that if one controller fails, the system can still survive with another controller taking the role of the failed controller.

U.S. Pat. No. 6,968,419 discloses a memory module that has a plurality of memory devices and a memory module controller configured to receive memory transaction from a first memory bus and to control access to the plurality of memory devices.

U.S. Pat. No. 5,822,251 discloses a flash memory system that is expandable using an interconnection of flash memory chips to a flash-specific DMA (Direct Memory Access) controller implemented on a system-on-chip (SoC).

While the above-noted references are suited for their intended purpose(s), there is a continuing need for reliable operations of memory systems.

SUMMARY

A large network of memory system is described comprising a plurality of system controllers and flash memory modules, in accordance with an embodiment of the invention.

Each system controller included in the network of memory system provides a connection to a plurality of flash memory modules wherein a flash memory module contains a plurality of flash arrays (i.e., plurality of flash devices, chips, and/or die) (hereinafter also referred to as "flash devices/chips/die"). Each flash memory module included in the network of memory system provides a plurality of interfaces connected to a plurality of system controllers.

A flashbus, in one embodiment, could be any high speed bus used in the interconnection between the system controllers and flash memory modules. Between a system controller and flash memory module connection, redundant paths are established, providing two interfaces for each connection. One interface is used as the primary connection and the second interface is for the redundancy.

None of the above-mentioned known references provide at least some advantages of an embodiment of the present invention. For example, an embodiment of the invention provide a large memory system with multi-chip memory controllers and multiple flash memory modules in order to advantageously permit reliability of operation that is achieved with the distribution of flash devices/chips/die into multiple memory chips.

An embodiment of the invention also provides innovations and/or improvements in a network of memory systems using flash devices which functions despite of failure in any system controller or flash memory module. With the recent proliferation of new bus and interconnect technology, an embodiment of the disclosed invention provides an interconnect strategy between system controllers and flash array modules in order to permit more throughput and flexibility of data access.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure. The various embodiments disclosed herein are not intended to limit the scope and spirit of the herein disclosure.

Preferred embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

Figure 1:
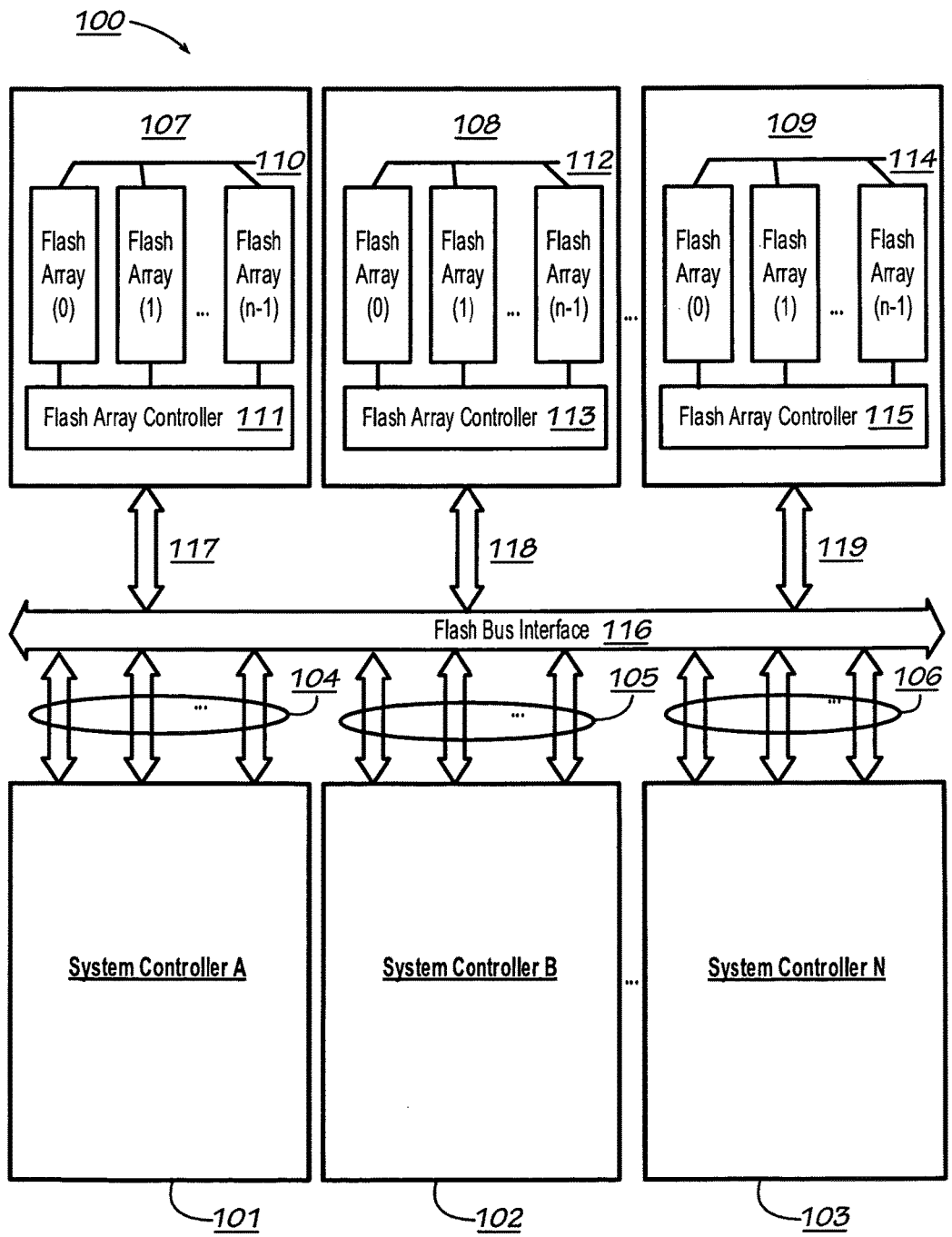
FIG. 1 is a diagram illustrating an architecture of a large network of memory systems comprising a plurality of flash memory modules and system controllers interconnected via a flashbus according to an embodiment of the invention.

FIG. 1 is a diagram illustrating an architecture of a large network of memory systems comprising a plurality of flash memory modules and system controllers interconnected via a flashbus according to an embodiment of the invention.

Described herein is a network of memory system (i.e., system 100 or apparatus 100), comprising a plurality of system controllers 101 to 103 that may be implemented as, for example, system-on-chip (SoC), although other technologies may be used for the system controllers 101-103.

The system 100 also includes a plurality of flash memory modules 107, 108 and 109 that is attached to (coupled to) the system controllers 101 to 103 through the communication bus interface 116 (e.g., a flashbus interface). In the description herein, a flashbus interface can be any different types of communication bus interfaces and is not limited to only a flashbus interface. Though system 100 is illustrated as including three system controllers (101, 102 and 103), and with flash memory modules (107, 108 and 109), any number of system controllers and flash memory modules may be used in the various embodiments shown in the drawings.

The system controllers A 101 to N 103 can be implemented as, but not limited to an integrated circuit, a module, a die or a system-on-chip (SoC) wherein each system controller communicates the memory specific transactions to the flash memory modules 107, 108 and 109.

The flash memory modules 107, 108 and 109 contain (or include) a plurality of flash arrays 110, 112, and 114, respectively. The flash arrays 110, 112, and 114 may be, for example, flash memory devices, chips, and/or die 110, 112 and 114 (hereinafter "flash devices/chips/die" 110, 112, and 114). The flash devices/chips/die are attached to (coupled to) the flash array controllers 111, 113 and 115, respectively. The flash array controllers are not dependent on the number of flash devices/chips/die connected to the flash array controllers, and the flash devices/chips/die in a flash memory module (e.g., module 106, 108, and/or 109) may vary in number. Therefore, the flash memory modules 107, 108 and 109 provide the respective flash array controllers 111, 112 and 113 that communicates between the system controllers 101, 102 and 103 and a potential unlimited number of flash devices/chips/die 110, 112 and 114 via the flashbus interface 116. Each flash array controllers 111, 113 and 115 can drive a first plurality of communications buses (e.g., flashbuses) that includes the communication buses (e.g., flashbuses) 117, 118 and 119 simultaneously. In the description herein, a flashbus can be any different types of communication bus and is not limited to only a flashbus. The flash memory modules 107, 108 and 109 are coupled to the flash bus interface 116 by the first plurality of flashbuses 117, 118, and 119, respectively.

The memory transactions from the system controllers 101, 102 and 103 are transmitted to a designated flash memory module among the flash memory modules 107, 108 and 109 via the flashbus interface 116. The communication bus interface (e.g., flashbus interface) 116 contains (or includes) a second plurality of communication buses (e.g., flashbuses) 104, 105 and 106 that interconnects the system controllers 101, 102, and 103, respectively, to the flashbus interface 116. The flashbus interface 116 herein supports the transfer of commands, address bytes, receive and transmit command, status, response, address and data bytes, other hand-shaking related signals, and/or other memory transaction-related signals, between the I/O device(s) 202 (FIG. 2) and the flash memory modules 107-109. Commonly-owned and commonly-assigned U.S. Pat. No. 8,447,908, entitled "Multilevel memory bus system for solid-state mass storage", for example, discloses example features that may be included in the flashbus interface 116, although other suitable examples of the flashbus interface 116 may be used in another embodiment of the invention. U.S. Pat. No. 8,447,908 is hereby fully incorporated herein by reference.

The features for and method of selecting a memory device (flash device) or addressing a memory location from a set of memory devices (flash devices) by using a single memory bus (flash bus) are known. For example, select lines (not shown) may be used. In addition, the number of data buses or FIFOs used is also not intended to be limiting. As would be evident to one of ordinary skill having the benefit of this disclosure, using more than one data bus, FIFO, or both, increases the available pathways through which data may be transmitted between I/O device(s) 202 (FIG. 2) and flash device interface 116.

Figure 2:
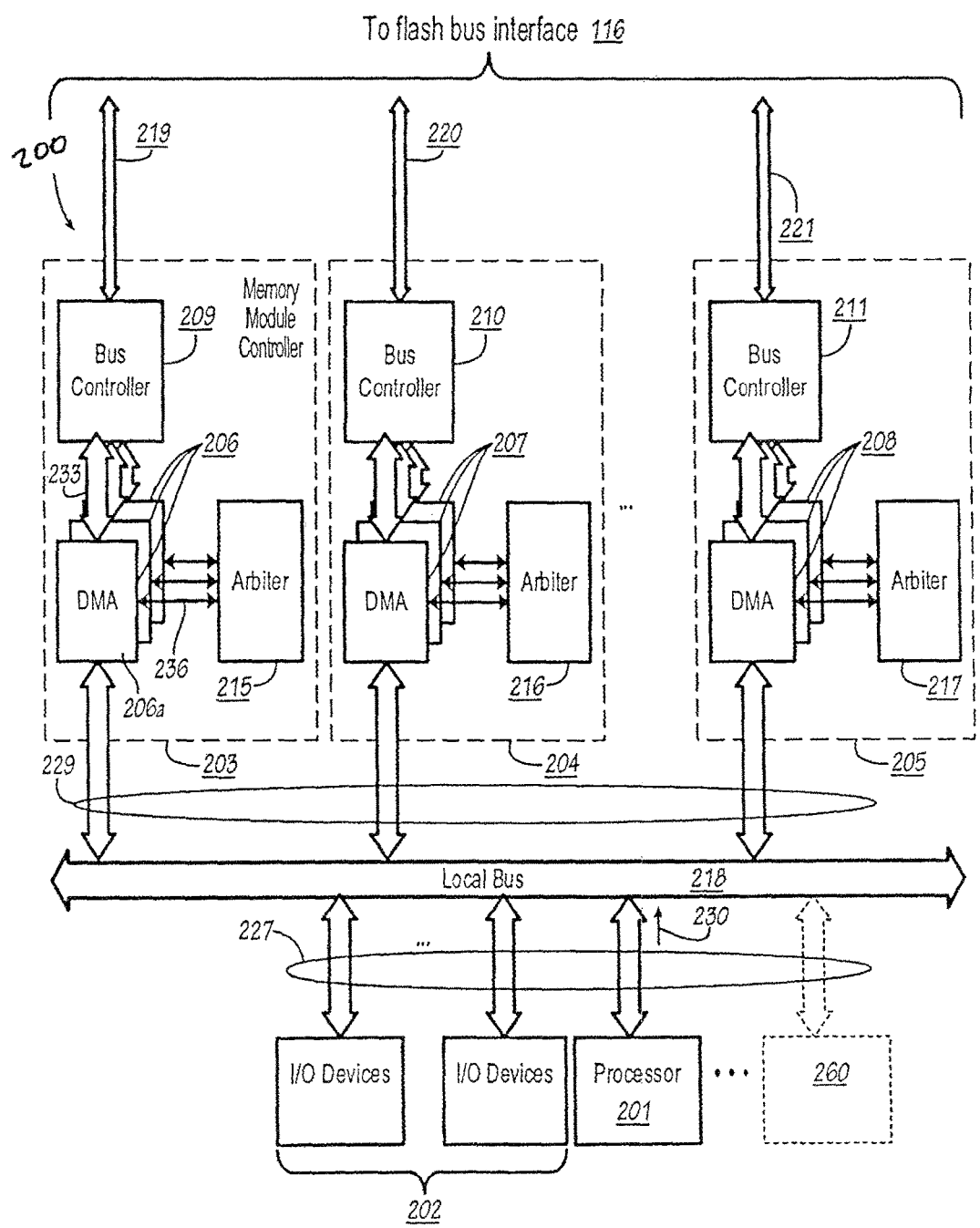
FIG. 2 is a diagram illustrating one possible embodiment of a system controller according to an embodiment of the invention.

FIG. 2 is a diagram illustrating one possible embodiment of a system controller according to an embodiment of the invention. This system controller 200 can be any (or each) of the system controllers 101-103 in FIG. 1.

The system controller 200 is implemented as a system for controlling memory transactions. The system controller 200 may comprise a processor 201, one or more input/output devices 202 and one or more memory module controllers 203, 204 and 205, where the processor 201, devices 201 and memory module controllers 203-205 are interconnected via a local bus interface 218. The number of I/O devices 202 and memory module controllers may vary. The number of processor in the system controller 200 may also vary. For example, the system controller 200 may include the processors 201 and 260 or any other plurality of processors connected to the local bus interface 218, or the system controller 200 may only include the single processor 201.

The system controller 200 may be implemented, but not limited to, in any of the following technologies: discrete logic circuits capable of memory transaction, an application specific integrated circuit having appropriate combinational and sequential logic gates implemented on a system-on-chip (SoC).

The local bus interface 218 may include one or more bus lines. The system may also include other elements such as local buffers or cache, sub-controllers, and the like. For example, the local bus interface 218 includes a first plurality of local bus lines 227 that couples the I/O devices 202 and processor 201 (and processor 260) to the local bus interface 218, and includes a second plurality of local bus lines 229 that couples the local bus interface 218 to the memory module controllers 203, 204, and 205.

In the further aspect of an embodiment of the invention, the memory module controllers 203-205 of the system controller 200 includes the following components: (a) one or more DMA (Direct Memory Access) controllers or flash-specific DMA controllers 206, 207 and 208, respectively; (b) bus controller 209, 210 and 211 that manages the external flashbus 219, 220 and 221, respectively; (c) arbiters 215, 216 and 217, respectively, if a plurality of flash specific DMA controllers is implemented.

To institute a memory transaction, the local processor 201 sends a command 230 to the any of the flash specific DMA controllers 206, 207 or 208 of any memory module controller 203, 204 or 205, respectively. Assume one of the flash specific DMA controllers (e.g., DMA controller 206a) from a group of flash specific DMA controller 206 is receiving commands 230 from the processor 201. The flash specific DMA controller 206a upon receiving the command 230 will convert the command 230 into flash-specific native commands 233 and then transmits the native commands 233 to the flash devices/chips/die 110-109 (FIG. 1) in sequence of reads, writes or erases data, and the like.

Should there be a plurality of DMA controllers 206 implemented within a memory module controller 203, then the arbiter 215 can be added. The arbiter 215 receives (and processes) an arbitration request 236 from one of the DMA controllers 206 for access to the flashbus 219 by the DMA controller 206 that sent the arbitration request 236. The flashbus 219 is coupled to the flashbus interface 116. The arbitration method performed by the arbiter 215 can be, for example, but not limited to the following: round robin arbitration, centralized arbitration, distributed arbitration, or another arbitration method.

The memory module controllers 203, 204 and 205 include the bus controllers 209, 210, and 211, respectively. The bus controllers 209, 210, and 211 drive the flashbuses 219, 220, and 221, respectively, in the second plurality of flashbuses 104 (FIG. 1). The flashbuses 219, 220, and 221 can only service one of the DMA controllers 206, 207, and 208, respectively, at a time. These flashbuses 219, 220, and 221 are used to communicate to the flash memory module controllers 203, 204 and 205, respectively.

Figure 3:
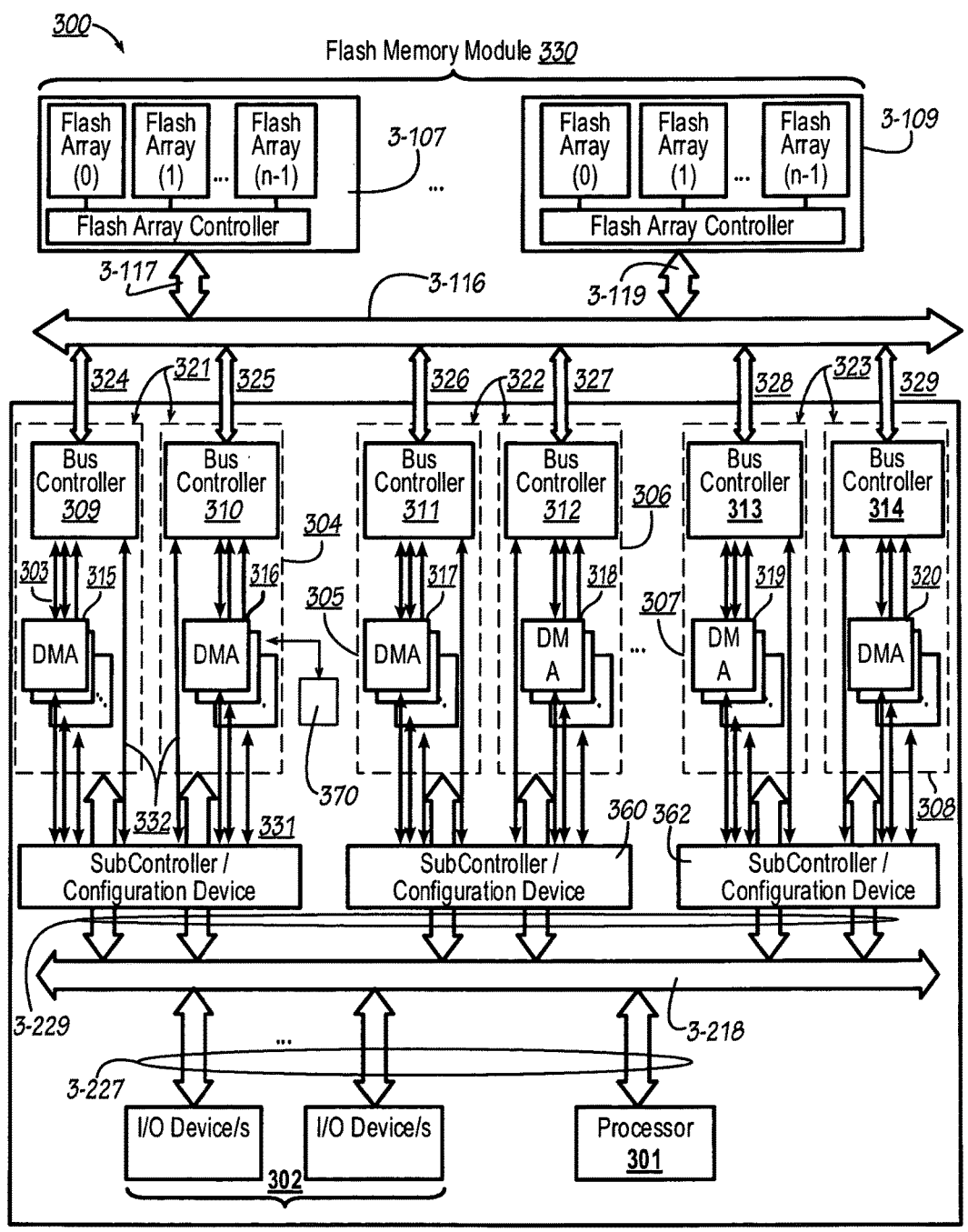
FIG. 3 is a diagram illustrating an embodiment of the memory module controller contained (included) in a system controller according to an embodiment of the invention.

FIG. 3 is a diagram illustrating an embodiment of the memory module controller contained (included) in a system controller according to an embodiment of the present invention. This system controller 300 can be any of the system controllers 101-103 in FIG. 1.

The system controller 300 presented herein has at least some of the similar components that are in the system controller 200 illustrated in FIG. 2, although the block diagram in FIG. 3 highlights another embodiment of the structural design and configuration of the memory module controllers 203, 204 and 205 of a system controller in FIG. 2.

The system controller 300 includes a processor 301, one or more input/output devices 302 and a plurality of memory module controllers 303, 304, 305, 306, 307, and 308 which are all attached (coupled) to the flashbus interface 3-116 (which is similar to the flashbus interface 116 in FIG. 1). As similarly noted above, the system controller 300 may include more than one processor 301.

Each memory module controller 303 to 308 may comprise any, but not limited to the following devices: (a) one or more flash specific DMA controllers 315 to 320, respectively, which can be custom made or commercially available and capable of initiating memory transactions and (b) bus controllers 309 to 314, respectively, capable of managing the flashbus and bus arbitration mechanism (configuration and/or method) wherein an arbiter can be incorporated into the bus controller or can be a separate individual module that can be added to each of the memory module controllers 303 to 308. Note that in FIG. 2, the arbiters 215, 216, and 217 are separate individual modules that are coupled to the DMA controllers 206, 207, and 208, respectively, and the arbiters 215, 216, and 217 are also included in the memory module controllers 203, 204, and 205, respectively. Therefore, an arbiter (similar to the arbiters 215, 216, or 217 of FIG. 2) can also be coupled to any or each of the DMA controllers 303-308. For example, an arbiter 370 can be coupled to the DMA controllers 316. Similarly, other separate arbiters (not shown in FIG. 3) can be coupled to the DMA controllers 315, 317, 318, 319, and 320, respectively.

Any of the memory module controllers 303 to 308 can also be implemented, but not limited to, any or a combination of the following technologies: a state machine, a discreet logic circuit capable of performing memory transactions, an application specific integrated circuit (ASIC) having appropriate combinational and sequential logic gates, and/or other technologies.

One aspect of an embodiment of the present invention provides a system controller 300 that can be attached to (and can communicate with) one or more flash memory modules 3-107 through 3-109 (also shown as 107 through 109 in FIG. 1) shown in via the flashbus interface 3-116. Therefore, FIG. 3 highlights the scheme or architecture of how the system controller 300 can be attached to the flashbus interface 116 of the system 100 shown in FIG. 1.

As illustrated, the system controller 300 is configured to provide a dual-memory module controller stages 321, 322 and 323. The stage 321 includes the memory module controllers 303 and 304. The stage 322 includes the memory module controllers 305 and 306. The stage 323 includes the memory module controllers 307 and 308. Each memory module controller 309, 310, 311, 312, 313, and 314 drives a flashbus 324, 325, 326, 327, 328, and 329, respectively. The second plurality of flashbuses 324, 325, 326, 327, 328, and 329 are coupled to the flashbus interface 3-116, while the first plurality of flashbuses 3-117 through 3-119 are also coupled to the flashbus interface 3-116. The flash memory modules 3-107 through 3-109 are coupled via the first plurality of flashbuses 3-117 through 3-119, respectively, to the flashbus interface 3-116. Therefore, each dual memory module controller stages 321-323 provides a dual flashbus connection to the flashbus interface 3-116 and each dual-flashbus is connected to one or more flash memory module 3-117 through 3-119 via the flashbus interface 3-116. For example, the dual memory module controller stage 321 is coupled to (and drives) the first pair of flashbuses 324 and 325 and provides a dual flash bus connection to the flashbus interface 3-116 via the first pair of flashbuses 324 and 325. Similarly, the dual memory module controller stage 322 is coupled to (and drives) the second pair of flashbuses 326 and 327 and provides a dual flash bus connection to the flashbus interface 3-116 via the second pair of flashbuses 326 and 327. Similarly, the dual memory module controller stage 323 is coupled to (and drives) the third pair of flashbuses 328 and 329 and provides a dual flash bus connection to the flashbus interface 3-116 via the third pair of flashbuses 328 and 329. The number of dual memory memory module controller stages may vary in the system controller 300, and the number of respective pairs of flashbuses coupled to and driven by respective dual memory module controller stages.

In FIG. 3, the system controller 300 includes the dual-memory module controller stages 321, 322 and 323. However, in the number of dual-memory module controller stages in the system controller 300 may vary in number from one dual-memory module controller stage to any given plurality of dual-memory module controller stages. For example, the system controller 300 can include four or more dual-memory module controller stages.

In the system controller 300, the first dual memory module controller stage 321 includes the first pair of two memory module controllers 303 and 304 driving the first pair of two flashbuses 324 and 325, respectively. A first memory module controller 303 is provided such that it includes a first plurality of DMA controllers 315 attached to a first bus controller 309 which drives the first flashbus 324. A second (or secondary) memory module controller 304 is provided and also includes a second plurality of DMA controllers 316 attached to a second bus controller 310 for driving the second flashbus 325.

In the system controller 300, the second dual memory module controller stage 321 includes the second pair of two memory module controllers 305 and 306 driving the second pair of two flashbuses 326 and 327, respectively. A third memory module controller 305 is provided such that it includes a third plurality of DMA controllers 317 attached to a third bus controller 311 which drives the third flashbus 326. A fourth memory module controller 306 is provided and also includes a fourth plurality of DMA controllers 318 attached to a fourth bus controller 312 for driving the fourth flashbus 327.

Similarly in the system controller 300, the third dual memory module controller stage 323 includes the third pair of two memory module controllers 307 and 308 driving the third pair of two flashbuses 328 and 329, respectively. A fifth memory module controller 307 is provided such that it includes a fifth plurality of DMA controllers 319 attached to a fifth bus controller 313 which drives the fifth flashbus 328. A sixth memory module controller 308 is provided and also includes a sixth plurality of DMA controllers 320 attached to a fifth bus controller 314 for driving the fifth flashbus 329.

In an embodiment of the present invention, the system controller 300 can be attached to (coupled) to one or more flash memory modules 3-107 through 3-109 by one or more flashbuses 324 to 329. This mechanism (configuration and/or method) provides a redundancy path for the system controller 300 when the flashbus 324 fails (or at least another one of the flashbuses 325-329 fails). So if the system controller 300 is connected to flash memory module(s) 330 using flashbuses 324 and 325, when one or more flashbuses (e.g., flashbus 324 and/or 325) fails to operate, the system controller 300 can still access flash memory module(s) 330 by using a surviving flashbus. If flashbus 324 fails, then the flashbuses 325-329 are surviving flashbuses. If flashbus 324 and 325 fail, then the flashbuses 326-329 are surviving flashbuses. A surviving flashbus permits the I/O device(s) 302 to access any of the flash memory module(s) 330 even if one or more of the flashbuses 324-329 fails as long as there is a surviving (non-failing) flashbus among the flashbuses 324-329.

This mechanism (configuration and/or method) expands the access of a system controller 300 to a plurality of flash array modules 330.

The mechanism (configuration and/or method) mentioned previously has an example implementation. For example, the memory module controllers 303 and 304 are attached to a sub-controller/configuration device 331 that manages the configuration or settings of the memory module controllers 303 and 304. While the sub-controller 331 is illustrated as controlling the dual-memory module controllers 321, one or more memory module controllers (303 or 304) may be used. The sub-controller/configuration device 331 manages the memory module controllers 303 and 304 and bus controllers 309 and 310. The sub-controller/configuration device 331 is capable of selecting a redundant path for the operation performed by the dual memory module controller stage 321 and send control signals 332 to the bus controllers 309 or 310. The sub-controller/configuration device 331 can detect the failure of the buses 324 and 325 driven by memory controllers 303 and 304, respectively, and therefore providing the dual-memory module controller 321 a redundant path either using the flashbus 324 or flashbus 325.

The stages 321-323 are coupled to the bus interface 3-218 (similar to bus interface 218 in FIG. 2) via the plurality of buses 3-229 and the I/O device(s) 302 and processor 301 are coupled to the bus interface 3-218 via the plurality of buses 3-227, similarly described above with reference to FIG. 2.

The sub-controller/configuration device 331 can detect the failure of the buses 324 and 325 by a standard bus handshaking protocol so as to detect any failure of the buses 324 and 325. In a bus handshaking protocol, for example, the subcontroller/configuration device 331 can send a "Hello" signal to the flash memory modules 330 via each of the bus 324 and 325 and can determine if there is any failure of the bus 324 and/or 325 is an "ack" acknowledgement signal is received (or is not received) by the subcontroller/configuration device 331 from the flash memory modules 330 in response to the Hello signals. The system controller 300 may alternatively use other handshaking protocols to detect for failures in any of the buses 324, 325, 326, 327, 328, and 329.

If the sub-controller/configuration device 331 detects the failure of one of the buses 324 and 325, then sub-controller/configuration device 331 sends the control signal 332 that disables the memory module controller 303 so that the surviving bus (and the associated memory module controller of the surviving bus) will allow the I/O device(s) to access the flash memory modules 330. For example, if the sub-controller/configuration device 331 detects a failure of the bus 324, then the sub-controller/configuration device 331 sends the control signal to the memory module controller 303 so that the memory module controller 303 is disabled, and the memory module controller 304 will process all commands and data and signals to and from the I/O device(s) 301 and processor 301 (including the command 330 from the processor 301 so that a memory transaction is initiated) and use the bus 325 for access to the flash memory module(s) 330.

Given the configuration shown in the FIG. 3, each set of the dual memory module controller stages 321, 322 and 323 can be separately attached to a flash memory module 330. Meaning, a system controller 300 can control a plurality of flash memory module(s) 330 using sets of memory module controllers 321 to 323 for driving a plurality of flashbuses per flash memory module and providing a parallel operation of memory transaction via at least some of the buses 324-329 and via at least some of the buses 3-117 through 3-119. It is noted that any of the dual-memory module controllers 321, 322, and 323 and subcontroller/configuration devices 331, 360, and 362, respectively, can be included (or implemented) in an embodiment of the system controller 200 of FIG. 2.

Figure 4:
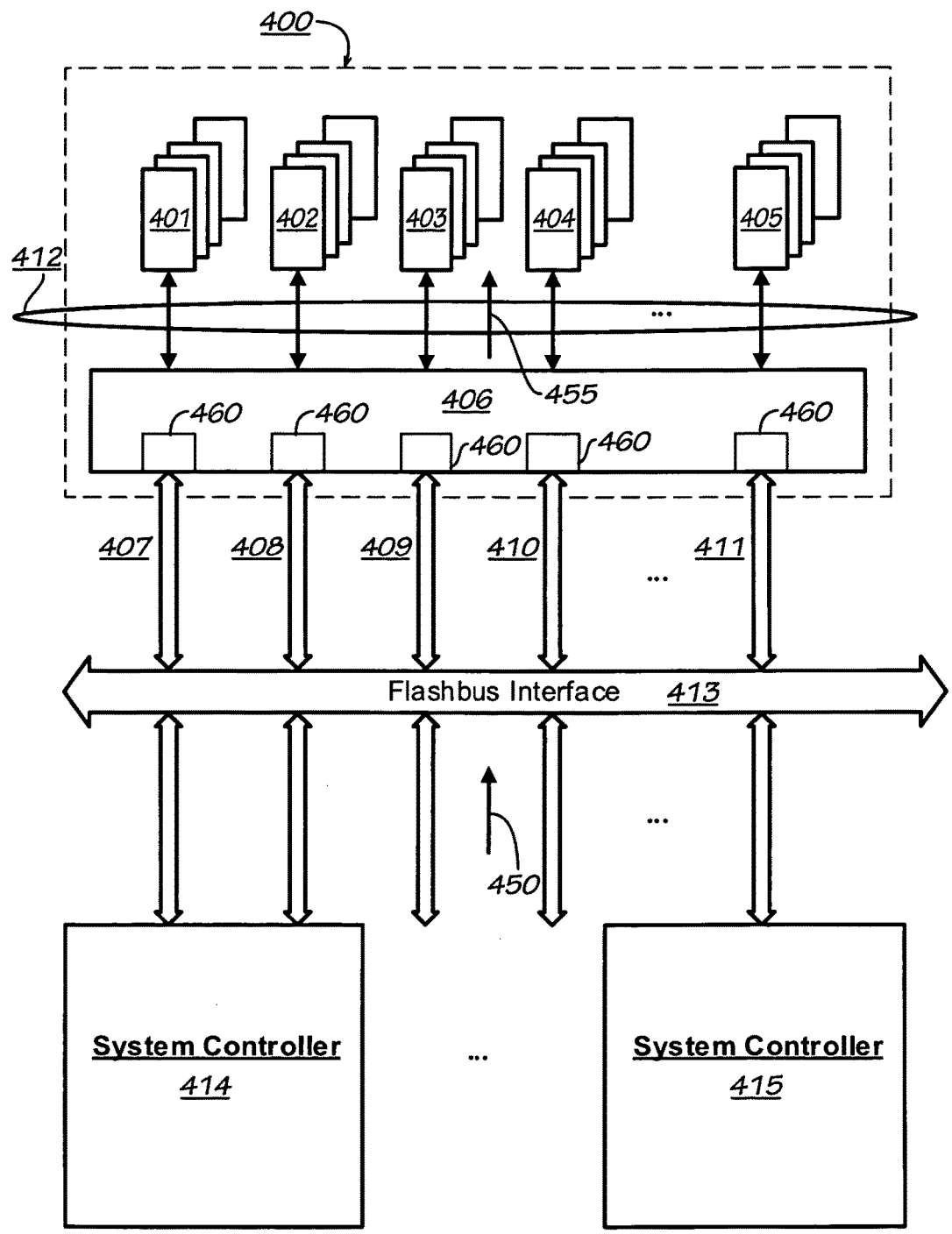
FIG. 4 is a diagram illustrating another embodiment of the flash memory module according to an embodiment of the invention.

FIG. 4 is a diagram illustrating an embodiment of the flash memory module 400 according to an embodiment of the invention. The flash memory module 400 includes a flash array controller 406 that provides an interface between flash devices/chips/die 401 through 405 and flashbus interface 413.

Each flash devices/chips/die 401-405 may include different vendors of flash devices. Each flash devices/chips/die 401-405 of the flash memory module 400 may be used or owned by one or more system controllers 414 or 415. The flash devices/chips/die 401-405 and/or system controllers 414-415 may vary in number.

The flash array controller 406 receives the system commands 450 transmitted by the system controller 410 and 411. The flash array controller 406 generally converts the system commands 450 into flash specific commands 455 that can be transmitted by the flash array controller 406 to one or more flash devices 401-405 via the flash memory bus 412. The flash specific commands 455 trigger flash operations such as read, write, erase, and/or other memory-related operations. The flash memory bus 412 also typically includes address and data lines and other controls signals such as Write Enable, Chip Enable, and/or other lines or signals. The flash array controller 406 may be a separate integrated system from the memory devices 401-405.

In a further aspect of an embodiment of the present invention, the flash memory module 400 can be attached to one or more system controllers 414 and 415. This is due to the fact that each or any group of flash devices/chips/die 401-405 can be used as a storage area of a particular system controller 414 and 415.

To allow this interconnectivity, a flash array controller 406 provides expander ports 460 that can allow the flash memory module 400 to be connected to a second controller, third controller, and the like system controllers such as the system controllers 414 and 415. The system controllers 414 or 415 may be similar in architecture to the system controller 200 in FIG. 2 or the system controller 300 in FIG. 3.

For example, in FIG. 4, the flashbuses 407 and 408 of flash memory module 400 are connected to the system controller 414, and then flashbus 409 is connected to the system controller 415.

One or more flashbuses 407-409 can be connected to a single system controller (controller 414 or 415) or a plurality of system controllers 414 or 415. Part of an embodiment of the invention is that the connection between a flash memory module 400 and the system controller 415 includes two or more flashbus lines to provide a redundant path in the event that one or more bus fails. For example, the flash memory module 400 and the system controller 415 may be connected via, for example, the flashbus lines 410 and 411 and also connected via the flashbus interface 413. This failover scheme and redundant path feature is, for example, disclosed in commonly-assigned and commonly-owned U.S. Patent Application entitled "Bus Arbitration With Routing and Failover Mechanism" 14/216,627 which is hereby fully incorporated herein by reference.

Figure 5:
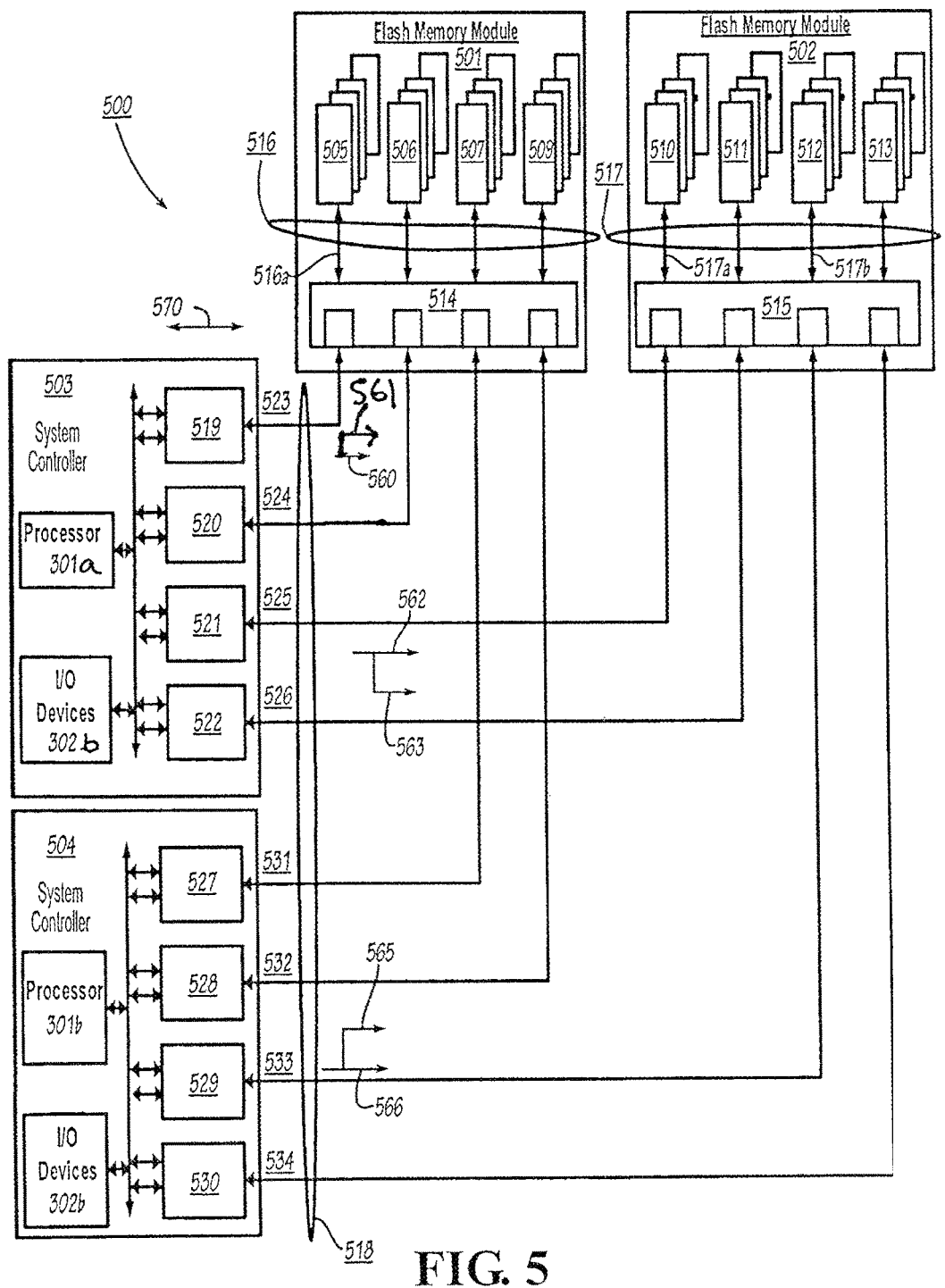
FIG. 5 is a diagram illustrating one embodiment of a network of memory systems in accordance with the invention.

FIG. 5 is a diagram illustrating one embodiment of a network of memory systems according to the present invention. The system 500 comprising two flash memory modules 501 and 502 which are attached to the system controllers 503 and 504. The number of flash memory modules and system controllers may vary.

A flash memory module 501 includes a first plurality of flash devices/chips/die 505, 506, 507, and 509 which are attached to a first flash array controller 514 via first plurality of flash memory buses 516. A second flash memory module 502 includes a second plurality of flash devices/chips/die 510, 511, 512, and 513 which are attached to a second flash array controller 515 via the second plurality of flash memory buses 517. Each flash memory module 501 and 502 is attached to the system controllers 503 and 504 via the flashbus interface 518 which is presented herein as (or including) a plurality of flashbuses 523, 524, 525, and 526 and 531, 532, 533, and 534. The system controllers 503 or 504 can be similar to any of the embodiments of the system controllers disclosed in FIGS. 1-3 above. In the example of FIG. 5, the system controller 503 includes the processor 301a and I/O devices 302a and memory module controllers 519, 520, 521, and 522. In the example of FIG. 5, the system controller 504 includes the processor 301b and I/O devices 302b and memory module controllers 527, 528, 529, and 530.

In another embodiment of the invention, the flash devices/chips/die 506 and 507 are omitted in the flash memory module 501, and/or the flash devices/chips/die 511 and 512 are omitted in the flash memory module 502. Therefore, in this embodiment of the invention, the flash memory module 501 includes a first plurality of flash devices/chips/die 505 and 509 which are attached to the first flash array controller 514 via first plurality of flash memory buses 516. The second flash memory module 502 includes the second plurality of flash devices/chips/die 510 and 513 which are attached to the second flash array controller 515 via the second plurality of flash memory buses 517. Each flash memory module 501 and 502 is attached to the system controllers 503 and 504 via the flashbus interface 518 which is presented herein as (or including) a plurality of flashbuses 523 and 525 and 532 and 534.

The ownership of the flash devices/chips/die 505-509 and 510-513 is distributed such that the memory module controllers 519-522 and 527-530 from system controllers 503 and 504, respectively, can control or access any of the flash devices 505-509 and 510-513 from the flash memory modules 501 and 502, respectively.

The first system controller 503 contains (includes) a first plurality of four memory module controllers 519-522, and the memory module controllers 519-522 are coupled to and drive the flashbuses 523-526, respectively. Similarly, the second system controller 504 contains (includes) a second plurality of four memory module controllers 527-530, and the memory module controllers 527-530 are coupled to and drive the flashbuses 531-534, respectively.

Assuming, for example, that flash devices/chips/die 505 and 509 are controlled by the memory module controllers 519 and 520, the connection between flash memory module 501 and system controller 503 is therefore established using the flashbuses 523 and 524. A preferred embodiment of the present invention includes that the interconnection between system controller 503 and flash memory module 501 should have at least two communication lines to promote redundant and fault-tolerant connection so that access to the flash memory module 501 is possible via a surviving flashbus (e.g., flashbus 523) if the other one (e.g., flashbus 524) fails.

Part of the control signals 560 transmitted by the memory module controllers 519 and 520 is an identification code 561 that indicates to what flash memory bus 516 does the intended flash device array 505 or 509 is connected to. The flash array controller 514 of the flash memory module 501 is capable of translating this code 561 in order to determine the flash memory bus 516 that is connected to the target flash device array. For example, the flash array controller 514 translates the code 561 so that the flash array controller 514 determines that a memory transaction 570 from the memory module controller 519 is directed via the flash bus 516a to the target flash array 505.

A further aspect of an embodiment of the present invention includes that the system controller 503 can control a plurality of flash memory modules, which in this case, aside from controlling the first flash memory module 501, system controller 503 is also connected to (and controls) the second flash memory module 502.

On the second flash memory module 502, it is assumed that the memory module controllers 521 and 522 controls the flash devices/chips/die 511 and 512. The system controller 503 uses the flashbuses 525 and 526 to communicate with the flash memory module 502.

With the same apparatus, the second flash array controller 515 receives control signals 562 with an identification code 563 from the memory module controllers 521 and 522 to identify from what flash memory bus 517 does the intended flash devices/chips/die 511 and 512 are attached to. For example, the flash array controller 515 translates the code 563 so that the flash array controller 515 determines that a memory transaction 570 from the memory module controller 521 is directed via the flash bus 517a to the target flash array 510.

The method and apparatus for system controller 504 is similar to system controller 503 as discussed above. Memory module controllers 527 and 528 control the flash devices/chips/die 506 and 507 of the first flash memory module 501. To communicate, the flashbuses 531 and 532 are established by the memory module controllers 527 and 528, respectively. In the second flash memory module 502, the flash devices/chips/die 510 and 513 are controlled by memory modules 529 and 530. To communicate, the flashbuses 533 and 534 are established by the memory module controllers 529 and 530, respectively.

The flash array controller 515 of the flash memory module 502 make use of the identification code 565 (in the control signals 566) sent by the memory modules 529 and 530 to identify which flash memory bus 515 does the intended flash devices/chips/die 510 and 513 are attached to. For example, the flash array controller 515 translates the code 565 so that the flash array controller 515 determines that a memory transaction 570 from the memory module controller 529 is directed via the flash bus 517b to the target flash array 512. The flash array controller 514 translates identification codes received from flash busses 524 and 526 to determine the target flash arrays of memory transactions 570. Similarly, the flash array controller 515 translates identification received codes from flash busses 531, 532, and 534 to determine the target flash arrays of memory transactions 570.

Figure 6:
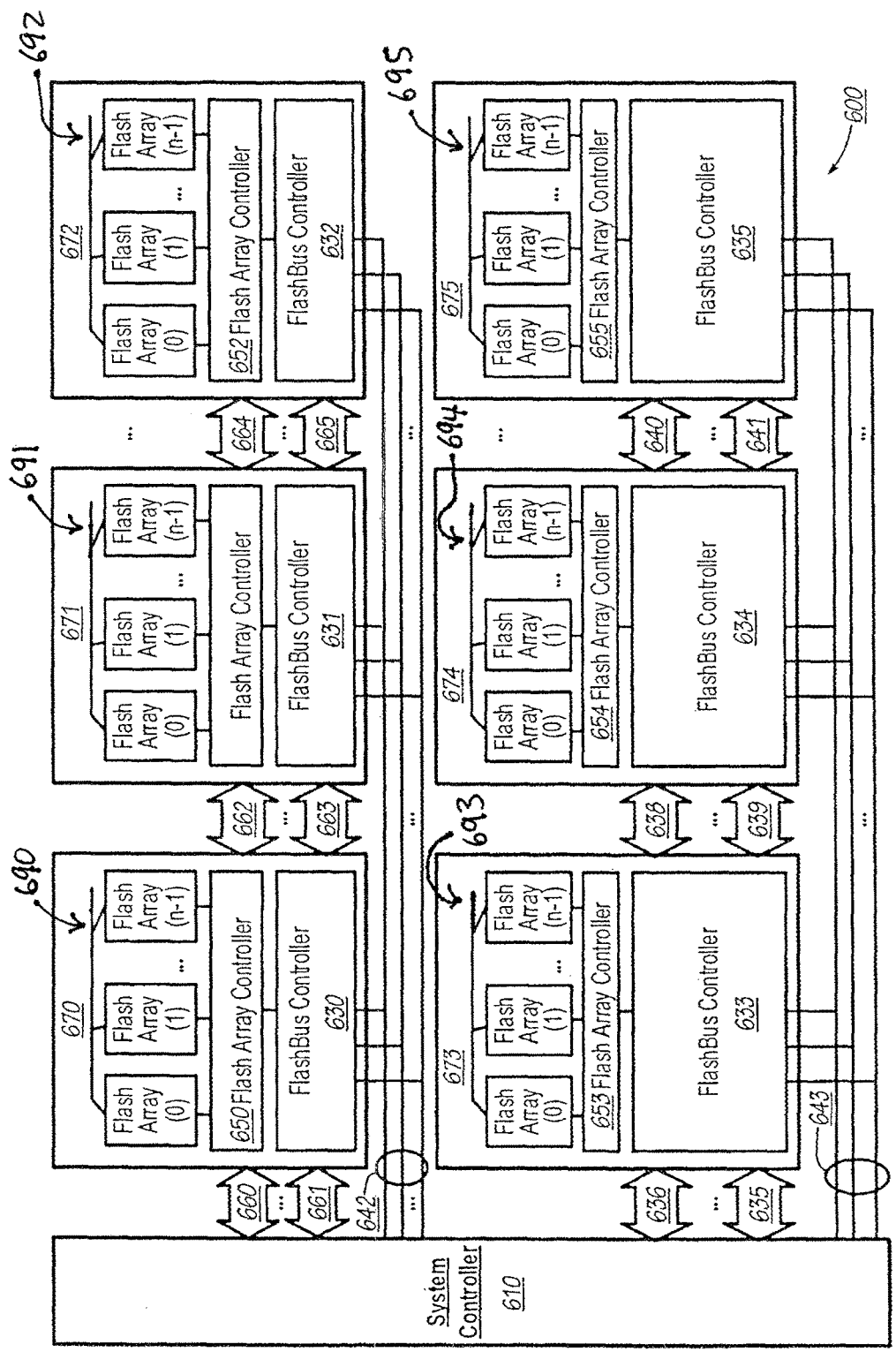
FIG. 6 is a block diagram of an architecture of a large network of memory systems, in accordance with an embodiment of the invention.

FIG. 6 is a block diagram of an architecture of a large network of memory systems, in accordance with an embodiment of the invention. This system (apparatus) 600 comprises a plurality of flash memory modules interconnected with other flash memory modules and to a system controller 610 via a point-to-point flashbus topology.

The system controller 610 is similar in functionality and structure as any of the system controllers described above with reference to the above-identified drawings.

The flashbus controllers 630-635 can receive and transmit command, status, response, address and data bytes to and from the system controller 610. The flashbus controllers 630-635 can also receive and transmit command, status, response, address and data bytes to and from adjacent flash memory modules 670-675.

The Flashbus Point-to-Point Lines includes a channel used to connect system controller 610 to/from flash memory modules 670-675 and a channel used to connect flash memory modules to/from other flash memory modules. For example, a channel includes a first plurality of point-to-point lines 660-661 and 636-635 that connects the system controller 610 to/from flash memory modules (e.g., flash memory modules 670 and 673). The number of point-to-point lines in this first plurality of lines may vary. As another example, a channel includes a second plurality of point-to-point lines 662-663, 664-655, 638-639, and 640-641. The number of point-to-point lines in this second plurality of lines may vary. In the example of FIG. 6, the lines 662-663 connect the modules 670 and 671, the lines 664-665 connect the modules 671 and 672, the lines 638-639 connect the modules 673-674, and the lines 640-641 connect the modules 674-675.

The point-to-point lines described herein can be, for example, flashbuses.

The Flashbus Shared Lines 642 and 643 are as follows. Some embodiments of the invention use these share lines 642 and/or 643 for sideband signaling such as, by way of example but not limited to arbitration, messaging, protocol handshakes.

The flashbus shared lines 642 and 643 may include an optional channel used to connect system controller 610 to/from flash memory modules 670-675, and an optional channel used to connect flash memory modules to/from other flash memory modules.

In another embodiment of the system 600, the flashbus shared lines 642 and 643 are omitted and not used for communications.

The Flash Array Controllers 650 through 655 are similar in functionality and structure as any of the flash array controllers described above with reference to the above-identified drawings.

Any of the Flash Array 690-695 is similar in functionality and structure as any flash array described above with reference to the above-identified drawings.

The Flash Modules 670-675 are similar in functionality and structure as any of the flash modules described above with reference to the above-identified drawings.

In an embodiment of the system 600, the Flashbus Chain comprises: (a) the system controller 610 connected point-to-point to an adjacent flashbus controller A and the adjacent flashbus controller A is connected to an adjacent flashbus controller B, wherein the system controller 610 communicates to the flashbus controller B by sending and receiving information via the flashbus controller A. For example, the system controller 610 communicates to the flashbus controller 631 by sending and receiving information via the flashbus controller 630 so that information is communicated between the system controller 610 and the flashbus controller 631.

In another embodiment of the system 600, the Flashbus Chain alternatively comprises: a flashbus controller A connected point-to-point to an adjacent flashbus controller B, wherein the adjacent flashbus controller B may be connected to an adjacent flashbus controller C. and so on. For example, the Flashbus Chain alternatively comprises a flashbus controller 633 connected point-to-point to an adjacent flashbus controller 634, and the adjacent flashbus controller 634 may be connected to an adjacent flashbus controller 635, and so on.

In an embodiment of the system 600, the nodes of the chain (system controllers and/or flashbus controllers) communicate with each other through the adjacent nodes of the chain (system controllers and/or flashbus controllers). As an example or illustration, system controller 610, flashbus controller 630, flashbus controller 631, flashbus controller 632 forms a flashbus chain of 4 nodes. Likewise as further illustration or example, flashbus controller 630 and flashbus controller 631 form a flashbus chain of 2 nodes.

Interactions in accordance with an embodiment of the invention are now discussed.

System Controller 610 communicates with Flash Array Controller 650 via FlashBus Controller 630.

System Controller 610 communicates with Flash Array Controller 651 via FlashBus Controller 630 and FlashBus Controller 631.

FlashBus Controller 630 identifies either via information from Flashbus Shared Lines 642 or information from the incoming command, status, response, address and data bytes from the Flashbus Point-to-Point Lines 660 that the incoming command, status, response, address and data bytes is not intended for the Flash module 670. The Flashbus controller 630 then passes the aforementioned command, status, response, address and data bytes to the adjacent FlashBus Controller 631 associated with Flash Module 671 via the Flashbus Point-to-Point Lines 662.

FlashBus Controller 631 identifies either via information from Flashbus Shared Line 642 or information from the incoming command, status, response, address and data bytes from the Flashbus Point-to-Point Lines 662 that the incoming command, status, response, address and data bytes is intended for the Flash module 671. Flashbus controller 631 then communicates with the Flash Array Controller 651 accordingly.

System Controller 610 communicates with Flash Array Controller 652 via FlashBus Controller 630, FlashBus Controller 631, and FlashBus Controller 632.

FlashBus Controller 630 identifies either via information from Flashbus Shared Lines 642 or information from the incoming command, status, response, address and data bytes from the Flashbus Point-to-Point Lines 660 that the incoming command, status, response, address and data bytes is not intended for the Flash module 670. The Flashbus Controller 630 then passes the aforementioned command, status, response, address and data bytes to the adjacent FlashBus Controller 631 associated with Flash Module 671 via the Flashbus Point-to-Point Lines 632.

FlashBus Controller 631 identifies either via information from Flashbus Shared Lines 642 or information from the incoming command, status, response, address and data bytes from the Flashbus Point-to-Point Lines 662 that the incoming command, status, response, address and data bytes is not intended for the Flash module 671. The Flashbus Controller 631 then passes the said command, status, response, address and data bytes to the adjacent FlashBus Controller 632 associated with Flash Module 672 via the Flashbus Point-to-Point Lines 664.

FlashBus Controller 632 identifies either via information from Flashbus Shared Line 642 or information from the incoming command, status, response, address and data bytes from the Flashbus Point-to-Point Lines 664 that the incoming command, status, response, address and data bytes is intended for the Flash module 672. Flashbus controller 632 then communicates with the Flash Array Controller 652 accordingly. Therefore, system controller 610 is able to communicate with the flash module 672. Additionally, in this example, the Flashbus Controllers 630 and 631 serve as a transmission conduit in the communication to the Flash module 672.

The above example uses the communication path comprising Flashbus Point-to-Point Lines 660, 662, and up to and until 664.

In the above example, an alternate path can use the communication path comprising Flashbus Point-to-Point Lines 631, 662, and up to and until 655.

If Flashbus point-to-point line 632 is faulty, the communication path from the system controller 810 to Flash module 672 can be Flashbus Point-to-Point Lines 630, 633, and up to and until 664.

Alternatively, the communication path from the system controller 610 to Flash module 672 can be any of the following:

Flashbus Point-to-Point Lines 660, 633, and up to and until 665.

Flashbus Point-to-Point Lines 661, 663, and up to and until 665.

Flashbus Point-to-Point Lines 661, 663, and up to and until 664.

The above alternative communication paths provide a fault tolerant mechanism in the system 600.

The Flashbus Controllers 630, 631 to 635 can pass the incoming command, status, response, address and data bytes to the adjacent Flash controller via cutthrough, store forward, or buffering.

Figure 7:
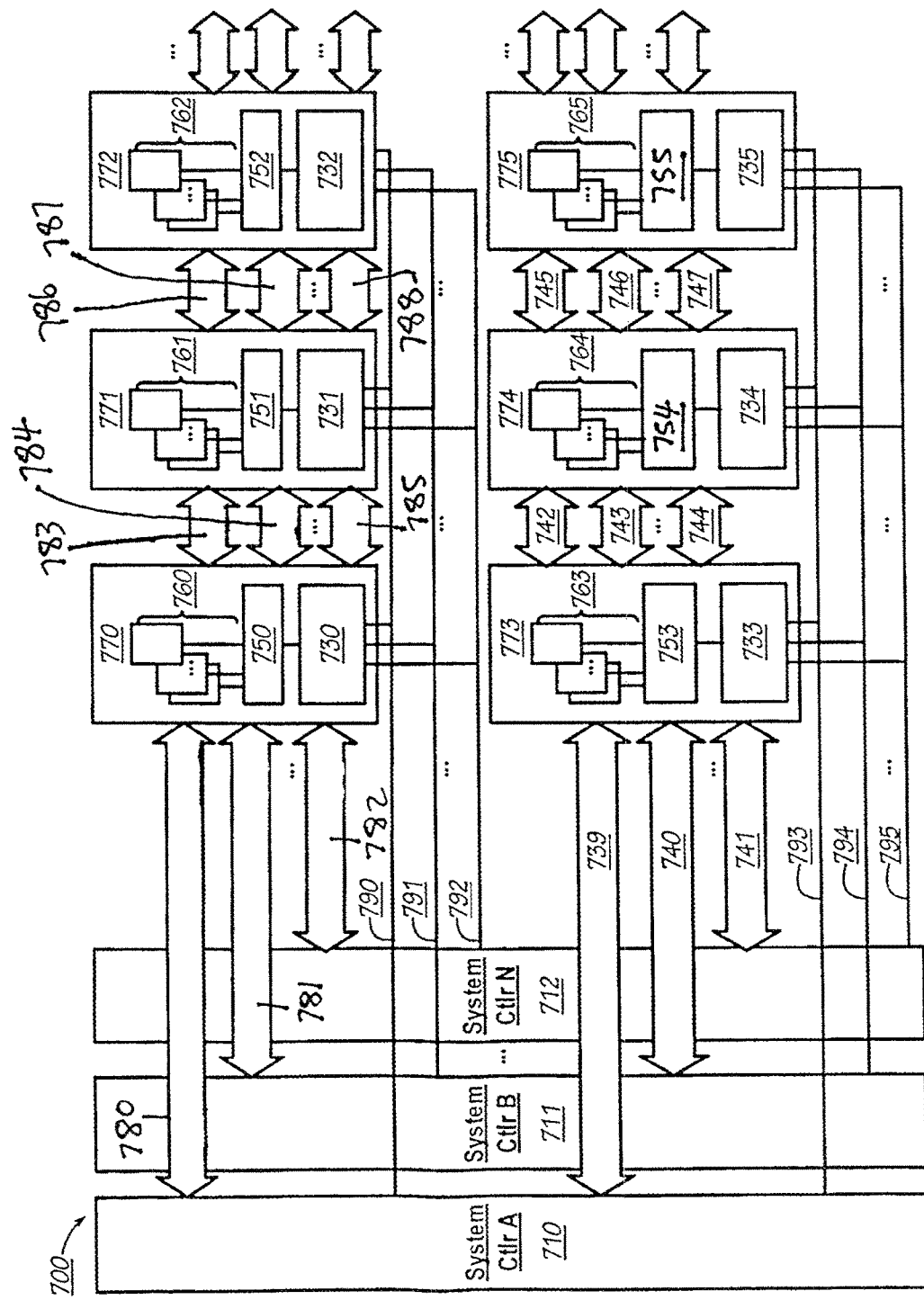
FIG. 7 is a block diagram of an architecture of a large network of memory systems, in accordance with another embodiment of the invention.

FIG. 7 is a block diagram of an architecture of a large network of memory systems, in accordance with another embodiment of the invention. The system 700 comprises a plurality of flash memory modules interconnected to other flash memory modules and to a plurality of system controllers (e.g., controllers 710, 711, and 712) via a point-to-point flashbus topology. The number of system controllers can vary in number from two or more system controllers.

The system controllers 710-712 are similar in functionality and structure as any of the system controllers described above with reference to FIG. 6.

The Flashbus Controllers 730-735 are similar in functionality and structure as any of the flashbus controllers described above with reference to FIG. 6.

The Flashbus Point-to-Point Lines 780-788 and 739-747 are similar in functionality and structure as any of the Flashbus Point-to-Point Lines described above with reference to FIG. 6.

The Flashbus Shared Lines 790-792 and 793-795 are similar in functionality and structure as any of the Flashbus Shared Lines described above with reference to FIG. 6.

The Flash Array Controllers 750-755 are similar in functionality and structure as any of the flash array controllers described above with reference to FIG. 6.

Any Flash Array 760-765 are similar in functionality and structure as any of the flash arrays described above with reference to FIG. 6.

The Flash Modules 770-775 are similar in functionality and structure as any of the flash modules described above with reference to FIG. 6.

A Flashbus Chain in FIG. 7 is similar in functionality and structure as any of the example flashbus chains described above with reference to FIG. 6.

Interactions in accordance with an embodiment of the invention are now discussed.

System Controller 710 communicates with Flash Array Controller 750 via FlashBus Controller 730.

System Controller 710 communicates with Flash Array Controller 751 via FlashBus Controller 730 and FlashBus Controller 731.

FlashBus Controller 730 identifies either via information from Flashbus Shared Lines 790 or information from the incoming command, status, response, address and data bytes from the Flashbus Point-to-Point Lines 760 that the incoming command, status, response, address and data bytes is not intended for the Flash module 770. The Flashbus Controller 730 then passes the aforementioned command, status, response, address and data bytes to the adjacent FlashBus Controller 731 associated with Flash Module 771 via the Flashbus Point-to-Point Lines 783.

FlashBus Controller 731 identifies either via information from Flashbus Shared Lines 790 or information from the incoming command, status, response, address and data bytes from the Flashbus Point-to-Point Lines 783 that the incoming command, status, response, address and data bytes is intended for the Flash module 771. Flashbus controller 731 then communicates with the Flash Array Controller 751 accordingly. Therefore, system controller 710 is able to communicate with the flash module 771. Additionally, in this example, the Flashbus Controller 730 serves as a transmission conduit in the communication to the Flash module 771.

System Controller 710 communicates with Flash Array Controller 752 via FlashBus Controller 730, FlashBus Controller 731, and FlashBus Controller 732.

FlashBus Controller 730 identifies either via information from Flashbus Shared Lines 790 or information from the incoming command, status, response, address and data bytes from the Flashbus Point-to-Point Lines 780 that the incoming command, status, response, address and data bytes is not intended for the Flash module 770. The Flashbus Controller 730 then passes the aforementioned command, status, response, address and data bytes to the adjacent FlashBus Controller 731 associated with Flash Module 771 via the Flashbus Point-to-Point Lines 783.

FlashBus Controller 731 identifies either via information from Flashbus Shared Lines 790 or information from the incoming command, status, response, address and data bytes from the Flashbus Point-to-Point Lines 783 that the incoming command, status, response, address and data bytes is not intended for the Flash module 771. The Flashbus Controller 731 then passes the above-mentioned command, status, response, address and data bytes to the adjacent FlashBus Controller 732 associated with Flash Module 772 via the Flashbus Point-to-Point Lines 786.

FlashBus Controller 732 identifies either via information from Flashbus Shared Line 790 or information from the incoming command, status, response, address and data bytes from the Flashbus Point-to-Point Lines 786 that the incoming command, status, response, address and data bytes is intended for the Flash module 772. Flashbus controller 732 then communicates with the Flash Array Controller 752 accordingly.

In the above-example where the system controller 710 communicates with the flash array controller 752 via Flashbus Controller 730, Flashbus Controller 731, and Flashbus Controller 732, the communication path used comprises Flashbus Point-to-Point Lines 780, 783, and up to and until 786.

A similar set of interactions may occur for when System Controller 711 communicates with Flash Array Controller 752. In this case, the communication path comprises Flashbus Point-to-Point Lines 781, 784, and up to and until 787.

A similar set of interactions may occur for when System Controller 712 communicates with Flash Array Controller 752. In this case, the communication path comprises Flashbus Point-to-Point Lines 782, 785, and up to and until 768.

Using the topology of system 700 in FIG. 7, each of the System Controllers 710, 711, and 712 has access to all Flash devices 760, 761, 762, 763, 764, and 765 contained in Flash modules 770, 771, 772, 773, 774, 775, respectively, and so on.

If Flashbus point-to-point line 783 is faulty, the communication path from the system controller 710 to Flash module 772 can be Flashbus Point-to-Point Lines 780, 784, up to and until 786.

The communication path from the Flashbus controller 730 to adjacent Flashbus controller 731 can be any of the Flashbus Interfaces 783, 784, 785.

The communication path from the Flashbus controller 731 to adjacent Flashbus controller 732 can be any of the Flashbus Interfaces 786, 787, 788.

The communication path from the System Controller 710 to the Flash module 772 is a combination of the above mentioned Flashbus Interfaces, in as long as they are working (i.e. not faulty).

The Flashbus Controller 730, 731 to 732 can pass the incoming command, status, response, address and data bytes to the adjacent Flash controller via cutthrough, store forward, or buffering.

As another example, system controller 710 communicates with Flash Array Controller 755 via FlashBus Controller 733, FlashBus Controller 734, and FlashBus Controller 735.

FlashBus Controller 733 identifies either via information from Flashbus Shared Lines 793 or information from the incoming command, status, response, address and data bytes from the Flashbus Point-to-Point Lines 739 that the incoming command, status, response, address and data bytes is not intended for the Flash module 773. The Flashbus Controller 733 then passes the aforementioned command, status, response, address and data bytes to the adjacent FlashBus Controller 734 associated with Flash Module 774 via the Flashbus Point-to-Point Lines 742.

FlashBus Controller 734 identifies either via information from Flashbus Shared Lines 793 or information from the incoming command, status, response, address and data bytes from the Flashbus Point-to-Point Lines 742 that the incoming command, status, response, address and data bytes is not intended for the Flash module 774. The Flashbus Controller 734 then passes the above-mentioned command, status, response, address and data bytes to the adjacent FlashBus Controller 735 associated with Flash Module 775 via the Flashbus Point-to-Point Lines 745.

FlashBus Controller 735 identifies either via information from Flashbus Shared Line 793 or information from the incoming command, status, response, address and data bytes from the Flashbus Point-to-Point Lines 745 that the incoming command, status, response, address and data bytes is intended for the Flash module 775. Flashbus controller 735 then communicates with the Flash Array Controller 755 accordingly.

In the above-example where the system controller 710 communicates with the flash array controller 775 via Flashbus Controller 733, Flashbus Controller 734, and Flashbus Controller 735, the communication path used comprises Flashbus Point-to-Point Lines 739, 742, and up to and until 745.

A similar set of interactions may occur for when System Controller 711 communicates with Flash Array Controller 775. In this case, the communication path comprises Flashbus Point-to-Point Lines 740, 743, and up to and until 746.

A similar set of interactions may occur for when System Controller 712 communicates with Flash Array Controller 775. In this case, the communication path comprises Flashbus Point-to-Point Lines 741, 744, and up to and until 747.

Using the topology of system 700 in FIG. 7, each of the System Controllers 710, 711, and 712 has access to all Flash devices 760, 761, 762, 763, 764, and 765 contained in Flash modules 770, 771, 772, 773, 774, 775, respectively, and so on.

If Flashbus point-to-point line 742 is faulty, the communication path from the system controller 710 to Flash module 775 can be Flashbus Point-to-Point Lines 739, 743, up to and until 745.

The communication path from the Flashbus controller 733 to adjacent Flashbus controller 734 can be any of the Flashbus Interfaces 742, 743, 744.

The communication path from the Flashbus controller 734 to adjacent Flashbus controller 735 can be any of the Flashbus Interfaces 745, 746, 747.

The communication path from the System Controller 710 to the Flash module 775 is a combination of the above mentioned Flashbus Interfaces, in as long as they are working (i.e. not faulty).

The Flashbus Controller 733, 734 to 735 can pass the incoming command, status, response, address and data bytes to the adjacent Flash controller via cutthrough, store forward, or buffering.

In FIG. 7, a system controller only uses one Flashbus Interface to connect to the adjacent Flash Module. However, a System Controller may have more than one Flashbus Interface connected to an adjacent Flash Module.

If system Controller 710 is faulty, System Controllers 711 and 712 can still access the data originally associated with System Controller 710 thereby adding fault tolerance to the System Controllers as well in the apparatus 700 of FIG. 7.

In an embodiment of the invention, the flashbus interface 413 in FIG. 4 includes the features of the Flashbus Point-to-Point Lines and/or flashbus shared lines of FIG. 7. Therefore, in the system 400 in FIG. 4, any of the system controllers 414 and 415 can communicate with flash devices/chips/die 401 through 405.

In an embodiment of the invention, the flashbus interface 518 in FIG. 5 includes the features of the Flashbus Point-to-Point Lines and/or flashbus shared lines of FIG. 7. Therefore, in the system 500 in FIG. 4, any of the system controllers 503 and 504 can communicate with flash memory modules 501 and 502.

Figure 8:
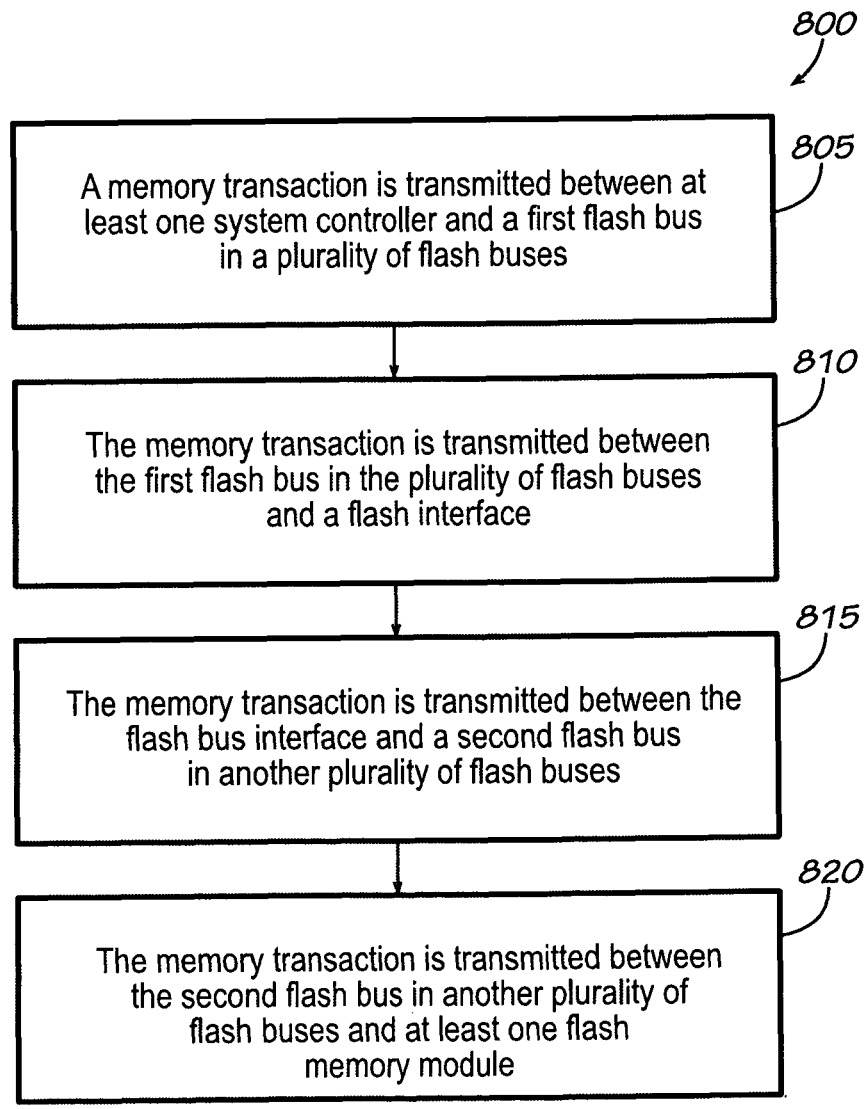
FIG. 8 is a flowchart of one method in accordance with an embodiment of the invention.

FIG. 8 is a flowchart of one method 800 in accordance with an embodiment of the invention.

At 805, a memory transaction is transmitted between at least one system controller and a first flashbus in a plurality of flashbuses.

At 810, the memory transaction is transmitted between the first flashbus in the plurality of flashbuses and a flash bus interface.

At 815, the memory transaction is transmitted between the flash bus interface and a second flashbus in another plurality of flashbuses.

At 820, the memory transaction is transmitted between the second flashbus in the another plurality of flashbuses and at least one flash memory module.

Therefore, embodiments of the invention can operate within a network of interconnected system-on-chip memory controllers and multiple memory arrays connected via a flash bus. An embodiment of the invention can provide a plurality of paths using the flash bus for multi-chip controllers in accessing a plurality of memory arrays, so that the multi-chip controllers can continually access a memory device even when one or more of the flash bus (connection) fails. An embodiment of the invention can also provide an alternate memory array for a memory controller and to serve as a back-up storage network. An embodiment of the invention provides various features including network connectivity of multi-chip controllers and multiple memory arrays, and path selection for redundancy paths in a connectivity of multi-chip memory controllers and memory arrays. These features are useful for fault tolerant and bus access balancing in a memory system.

In particular, an embodiment of the invention provides a capability of a flash bus to be expanded by utilizing the flash bus to connect one memory controller to a multiple memory array chip or in the same manner allowing one memory array chip to be controlled by multiple memory controllers. This configuration allows the connection of controller and memory array chips to form a network connectivity for the purpose of memory sharing, redundancy path and path selection mechanism, and bus failure and routing operations.

An embodiment of the invention also provides multi-level of arbitration and priority selection for flash bus access. A memory controller for the flash bus includes a unique algorithm that allows fairness and high utilization in the bus. An intelligent arbiter also enables bus priority selection during a flash bus transaction.

An embodiment of the invention advantageously provides an infrastructure of a network (including multichip memory controllers and memory array chips) that is fault tolerant and redundant by using a flash bus. This infrastructure ensures system availability, with redundant components that further increase the system uptime. An embodiment of the invention can provide the market with efficient and reliable products and products that achieve high system availability.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus comprising:
a communication bus interface;
a flash memory module coupled to the communication bus interface via a communication bus;
a system controller coupled to the communication bus interface via an external communication bus; and
wherein the system controller performs a memory transaction via the communication bus interface to the flash memory module.

2. The apparatus of claim 1, wherein:
the flash memory module comprises a first flash memory module, said first flash memory module comprising:
a first flash array including a first plurality of flash memory devices and a first flash array controller coupled to the first flash array.

3. The apparatus of claim 1, wherein the system controller comprises a first system controller, said first system controller comprising:
a local bus interface;
an input/output device coupled to the local bus interface;
a processor coupled to the local bus interface; and
a memory module controller coupled to the local bus interface.

4. The apparatus of claim 1,
wherein the system controller comprises: a first system controller;
wherein the apparatus further comprises a second system controller;
wherein the flash memory module comprises: a first flash memory module and a second flash memory module;
wherein the first system controller can access a first plurality of flash memory devices in the flash memory module via the first the communication bus and a second plurality of flash memory devices in a second flash memory module via a second communication bus; and
wherein the second system controller can access a third plurality of flash memory devices in the first flash memory module via a third communication bus and a fourth plurality of flash memory devices in the second flash memory module via a fourth communication bus.

5. The apparatus of claim 3, wherein the memory module controller comprises a first memory module controller;
wherein the first memory module controller includes a bus controller and a direct memory access (DMA) controller.

6. The apparatus of claim 3,
wherein the memory module controller comprises a dual memory module controller;
wherein the dual memory module controller includes a first memory module controller and a second memory module controller, and a subcontroller/configuration device coupled to the dual memory module controller.

7. The apparatus of claim 4, wherein the first system controller comprises a first memory module controller configured to drive the first communication bus and a second memory module controller configured to drive the second communication bus;
wherein the second system controller comprises a third memory module controller configured to drive the third communication bus and a fourth memory module controller configured to drive the fourth communication bus;
wherein the first flash memory module comprises a first flash array controller coupled to the first communication bus and to the second communication bus; and
wherein the second flash memory module comprises a second flash array controller coupled to the third communication bus and to the fourth communication bus.

8. The apparatus of claim 5,
wherein the memory module controller includes an arbiter for processing an arbitration request from the DMA controller.

9. The apparatus of claim 6,
wherein the first memory module controller includes a first bus controller and a first direct memory access (DMA) controller;
wherein the second memory module controller includes a second bus controller and a second direct memory access (DMA) controller.

10. The apparatus of claim 9,
wherein the first memory module controller includes a first arbiter for processing an arbitration request from the first DMA controller;
wherein the second memory module controller includes a second arbiter for processing an arbitration request from the second DMA controller.

11. An apparatus comprising:
a plurality of flash memory modules interconnected with other flash memory modules and to a system controller via a point-to-point flashbus topology;
wherein the plurality of flash memory modules comprises a first flash memory module and a second flash memory module;
wherein the point-to-point flashbus topology comprises a first plurality of point-to-point lines and a second plurality of point-to-point lines;
wherein the system controller is coupled by the first plurality of point-to-point lines to the first flash memory module; and
wherein the first flash memory module is coupled by the second plurality of point-to-point lines to the second flash memory module.

12. The apparatus of claim 11, wherein the system controller comprises a first system controller, said first system controller comprising: a local bus interface; an input/output device coupled to the local bus interface; a processor coupled to the local bus interface; and a memory module controller coupled to the local bus interface.

13. The apparatus of claim 11, wherein the system controller is coupled to the first flash memory module by the first plurality of point-to-point lines comprising a first plurality of flashbus point-to-point lines and the first flash memory module is coupled to the second flash memory module by the second plurality of point-to-point lines comprising a second plurality of flashbus point-to-point lines.

14. The apparatus of claim 11, wherein the system controller is further coupled to the first flash memory module and second flash memory module by a plurality of flashbus shared lines.

15. The apparatus of claim 11, wherein the system controller comprises a first system controller;
   wherein the apparatus further comprises a second system controller;
   and
   wherein the first system controller and second system controller are coupled to the first flash memory module and the first flash memory module is coupled to the second flash memory module.

16. The apparatus of claim 11,
   wherein the system controller comprises a first system controller;
   wherein the apparatus further comprises a second system controller;
   wherein the first system controller and second system controller are coupled to the first flash memory module by a first plurality of flashbus point-to-point lines and the first flash memory module is coupled to the second flash memory module by a second plurality of flashbus point-to-point lines.

17. The apparatus of claim 11,
   wherein the system controller comprises a first system controller;
   wherein the apparatus further comprises a second system controller;
   wherein the first system controller and second system controller are coupled to the first flash memory module and second flash memory module by a plurality of flashbus shared lines.

18. The apparatus of claim 13,
   wherein flashbus point-to-point lines permit fault tolerant communications between the system controller and the plurality of flash memory modules.

19. A method comprising:
   transmitting a memory transaction between a system controller and a first communication bus;
   transmitting the memory transaction between the first communication bus and a flash bus interface;
   transmitting the memory transaction between the flash bus interface and a second communication bus; and
   transmitting the memory transaction between the second communication bus and a flash memory module.

20. The method of claim 19, wherein the system controller comprises a first system controller, said first system controller comprising:
   a local bus interface;
   an input/output device coupled to the local bus interface;
   a processor coupled to the local bus interface; and
   a memory module controller coupled to the local bus interface.

\* \* \* \* \*